US012544234B2

(12) United States Patent
Linares et al.

(10) Patent No.: US 12,544,234 B2
(45) Date of Patent: Feb. 10, 2026

(54) EXPANDABLE WORM SCREW JACK FOR INSTALLATION BETWEEN UPPER AND LOWER SUCCEEDING ARTICULAR PROCESSES AND HAVING ENHANCED BONE GRIPPING GEOMETRY AND TEETH PROFILES

(71) Applicant: Linares Spinal Devices, LLC, Auburn Hills, MI (US)

(72) Inventors: Miguel A. Linares, Bloomfield Hills, MI (US); Richard W. Easton, Bloomfield Hills, MI (US)

(73) Assignee: Linares Spinal Devices, LLC, Auburn Hills, MI (US)

( * ) Notice: Subject to any disclaimer, the term of this patent is extended or adjusted under 35 U.S.C. 154(b) by 314 days.

(21) Appl. No.: 18/131,607

(22) Filed: Apr. 6, 2023

(65) Prior Publication Data

US 2023/0320864 A1 Oct. 12, 2023

Related U.S. Application Data

(60) Provisional application No. 63/328,309, filed on Apr. 7, 2022.

(51) Int. Cl.
*A61F 2/44* (2006.01)
*A61B 17/70* (2006.01)
(Continued)

(52) U.S. Cl.
CPC ........ *A61F 2/4405* (2013.01); *A61B 17/7065* (2013.01); *A61F 2002/30131* (2013.01);
(Continued)

(58) Field of Classification Search
CPC .. A61B 17/7062–17/707; A61F 2/4405; A61F 2/4455–2/447
See application file for complete search history.

(56) References Cited

U.S. PATENT DOCUMENTS 1,500,859 A * 7/1924 Wright ..................... B66F 3/18
254/92
8,137,355 B2 3/2012 Hestad
(Continued)

FOREIGN PATENT DOCUMENTS

KR 20040060420 A * 7/2004 ......... A61B 17/7065
WO 2021214601 A1 10/2021
(Continued)

OTHER PUBLICATIONS

International Preliminary Report on Patentability for Appln. No. PCT/US2023/065486 mailed Oct. 8, 2024, 7 pages.

*Primary Examiner* — Julianna N Harvey
(74) *Attorney, Agent, or Firm* — Dinsmore & Shohl LLP

(57) ABSTRACT

A spinal jack adapted for installation between first and second vertebral processes, including a three dimensional and arcuate ergonomic main body constructed from first lower and second upper subset body portions, from which is displaceable an upper body between retracted and expanded positions. Each of the jack halves further includes gripping portions adapted for engaging the vertebral processes and preventing detachment following implantation. A worm gear mechanism is provided for expanding or retracting the jack halves in order to establish a corrected adjusted orientation between the processes.

13 Claims, 27 Drawing Sheets

(51) Int. Cl.
*A61F 2/30* (2006.01)
*A61F 2/46* (2006.01)

(52) U.S. Cl.
CPC .............. *A61F 2002/30235* (2013.01); *A61F 2002/30525* (2013.01); *A61F 2002/30904* (2013.01); *A61F 2002/3092* (2013.01); *A61F 2002/30985* (2013.01); *A61F 2002/4611* (2013.01); *A61F 2002/4627* (2013.01)

(56) References Cited

U.S. PATENT DOCUMENTS

| | | |
|---|---|---|
| 8,377,072 B2 | 2/2013 | Stad et al. |
| 8,465,493 B2 | 6/2013 | Hestad |
| 8,545,563 B2 | 10/2013 | Brun et al. |
| 8,585,738 B2 | 11/2013 | Linares |
| 8,623,056 B2 | 1/2014 | Linares |
| 8,821,550 B2 | 9/2014 | Hestad |
| 9,023,108 B2 | 5/2015 | Hansell et al. |
| 9,468,475 B2 | 10/2016 | Hestad |
| 9,474,626 B2 | 10/2016 | Jimenez et al. |
| 10,159,584 B2 | 12/2018 | Carnes et al. |
| 10,238,383 B2 | 3/2019 | Moskowitz et al. |
| 10,376,293 B2 | 8/2019 | Hestad |
| 10,433,982 B2 | 10/2019 | Willis et al. |
| 10,779,959 B2 | 9/2020 | Ty et al. |
| 10,952,723 B2 | 3/2021 | Moskowitz et al. |
| 11,135,771 B1 | 10/2021 | Reith et al. |
| 11,432,853 B2 | 9/2022 | Hestad |
| 11,432,937 B1 | 9/2022 | Linares |
| 11,481,886 B1 | 10/2022 | Reith et al. |
| 11,491,028 B2 | 11/2022 | Carnes et al. |
| 11,597,148 B2 | 3/2023 | Reith et al. |
| 2004/0059271 A1 | 3/2004 | Berry |
| 2006/0136062 A1 | 6/2006 | DiNello et al. |
| 2006/0149385 A1* | 7/2006 | McKay ................ A61F 2/4455 623/17.15 |
| 2007/0255415 A1* | 11/2007 | Edie ...................... A61F 2/4611 606/90 |
| 2008/0319550 A1* | 12/2008 | Altarac .............. A61B 17/7065 606/90 |
| 2009/0062918 A1 | 3/2009 | Wang et al. |
| 2011/0138948 A1* | 6/2011 | Jimenez .................. F16H 25/20 74/424.82 |
| 2011/0160861 A1* | 6/2011 | Jimenez ................ A61F 2/4455 623/17.16 |
| 2011/0224731 A1 | 9/2011 | Smisson, III et al. |
| 2011/0251692 A1 | 10/2011 | McLaughlin et al. |
| 2012/0185045 A1 | 7/2012 | Morris et al. |
| 2013/0110168 A1 | 5/2013 | McCormack et al. |
| 2013/0274883 A1 | 10/2013 | McLuen et al. |
| 2014/0343608 A1 | 11/2014 | Whiton et al. |
| 2016/0089247 A1* | 3/2016 | Nichols ................ A61F 2/4455 623/17.16 |
| 2016/0135851 A1* | 5/2016 | Woodworth ....... A61B 17/7071 606/249 |
| 2016/0135853 A1 | 5/2016 | Altarac et al. |
| 2016/0310188 A1* | 10/2016 | Marino ..................... A61F 2/28 |
| 2017/0095348 A1* | 4/2017 | Josse .................. A61B 17/7032 |
| 2018/0263785 A1 | 9/2018 | Vishnubhotla et al. |
| 2019/0254838 A1* | 8/2019 | Miller ..................... A61F 2/447 |
| 2019/0274846 A1 | 9/2019 | Sack et al. |
| 2020/0030116 A1 | 1/2020 | Jimenez et al. |
| 2020/0337852 A1 | 10/2020 | McLuen et al. |
| 2021/0052307 A1 | 2/2021 | Soo et al. |
| 2022/0323235 A1 | 10/2022 | Peyman et al. |
| 2023/0136415 A1* | 5/2023 | Linares .............. A61B 17/8605 606/247 |

FOREIGN PATENT DOCUMENTS

| | | |
|---|---|---|
| WO | 2021/225374 A1 | 11/2021 |
| WO | 2021219996 A1 | 11/2021 |

* cited by examiner

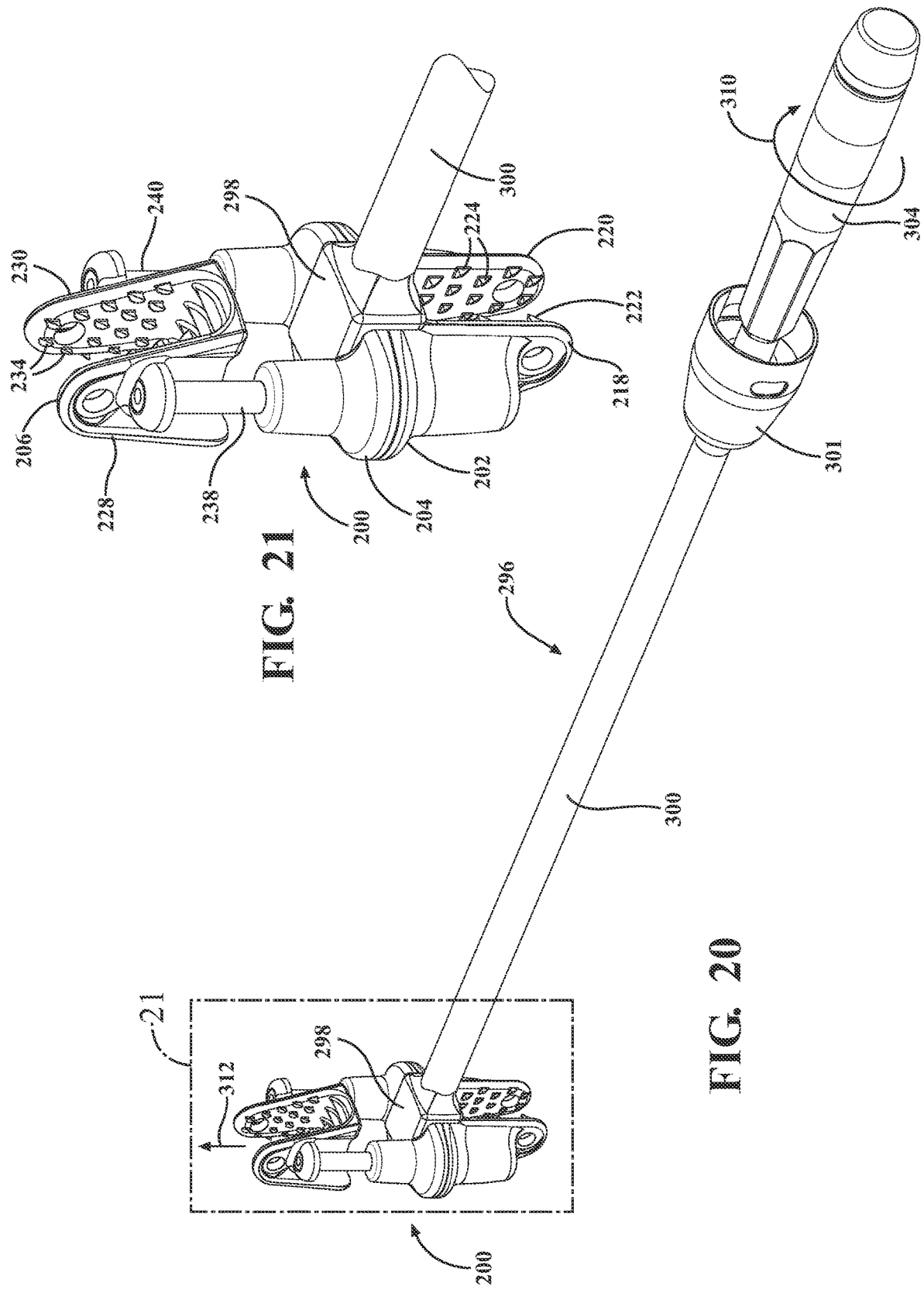

EXPANDABLE WORM SCREW JACK FOR INSTALLATION BETWEEN UPPER AND LOWER SUCCEEDING ARTICULAR PROCESSES AND HAVING ENHANCED BONE GRIPPING GEOMETRY AND TEETH PROFILES

CROSS REFERENCE TO RELATED APPLICATIONS

The present application claims the priority of U.S. Ser. No. 63/328,309 filed Apr. 7, 2022.

FIELD OF THE INVENTION

The present invention relates generally to spinal jacks for providing inter-vertebral support. More specifically, the present invention teaches an adjustable spinal jack for installation between superior articular processes of upper and lower succeeding vertebrae. Additional variants include reconfiguring the implant body for other non-vertebral applications, such as in use with first and second segmented bones associated with any of a humerus, femur or the like.

BACKGROUND OF THE INVENTION

Spinal jacks designs are known in the prior art for providing adjusted and secure positioning support between succeeding spinal vertebra. Examples of these are depicted in each of Linares U.S. Pat. No. 8,623,056 and Linares U.S. Pat. No. 8,585,738.

SUMMARY OF THE PRESENT INVENTION

The present invention discloses a spinal jack adapted for installation between first and second vertebral processes including a three dimensional and arcuate ergonomic main body constructed from first lower and second upper subset body portions, from which is displaceable an upper body between retracted and expanded positions. Each of the jack halves further includes gripping portions adapted for engaging the vertebral processes and preventing detachment following implantation. The gripping portions each further include spaced apart sides and an interconnected recessed end defining a pocket adapted to receive the vertebral process therebetween.

A worm gear mechanism is provided for expanding or retracting the jack halves in order to establish a corrected adjusted orientation between the processes. The worm gear mechanism further includes a central horizontally arrayed and rotatable worm gear, a bit engaging portion integrally being formed with the worm gear and projecting from a surface of the main body.

The rotatable worm gear further includes a spiral array of gear teeth extending along its generally horizontal length which mesh with crosswise bevel arranged and annular array of gear teeth arranged upon each of a pair of outer gears arranged upon opposite sides. The upper body further includes a pair of downwardly extending stems, which are anchored at upper ends to lateral locations of the upper body, with the stems extending downwardly and respectively seating within and through elongated interior channels or passageways defined in the upper subset body portion. Bottom extending portions of the stems each further incorporate additional threads, which rotatably engage inner spiraling threads configured in the outer gears.

Other features include repositioning the jack halves in a depth-offsetting fashion in order to inwardly redirect inwardly compression forces exerted by the vertebral processes. The gripping portions further include gripping teeth distributed along the opposing gripping surfaces and facilitating unidirectional installation of the processes along with preventing detachment of uneven surfaces of the processes once installed. The worm gear arrangement prevents reverse adjustment in response to inward forces applied by the superior articular processes on the jack halves.

The body and inter-expandable jack halves further include any medical grade metal or plastic. The main body incorporates a recessed cavity for receiving the central worm gear and outer bevel gears. Also provided are additional cavities configured into the main body for seating the displaceable stems.

Additional aspects of the invention include the ability to 3D print the individual outer body components, including each of the first and second subset lower body portions and displaceable upper body. Without limitation, the additive printed material can include a titanium or other suitable medical grade material including other metals or polymeric composites.

A further advantage of additive printing of the body components is the ability to modify the density of the material, this including reducing a surface material distribution through such as a "latticing" technique which envisions gaps in the printing of the surface layers, such as which can include the gripping portions and spinal process receiving pockets. In this fashion, in-growth of bone into the latticed areas is promoted which enhances the engagement of the implant.

The additive printing techniques employed for producing the implant body components permit the configuration of the teethed gripping portions according to varying sizes and directions, such as increasing in size in both inward and/or downward seating directions in order to enhance the initial seating engagement of the spinal processes into the implant gripping pockets.

Additional to deformation engagement of the seated implant pockets around the processes, such as through the use of crimping pliers, other fastener options for securing the upper and lower implant bodies to the vertebral processes include the use of tubular shaped rivets, which can be installed following initial drilling through the bone aligning with the apertures in the seating pockets. The rivets can include surface apertures for facilitating bone in-growth and can also be hollowed, in the latter instance, permitting the use of retention cables for providing additional retention. Removal of previously installed rivets can be further accomplished through the use of a width directed tool bit which is seats within and laterally displaces the rivet.

Also disclosed is an installation tool that provides for locating and resistive seating of the spinal implant against the spinal processes of the successive vertebrae. A forward end of the tool exhibits a rectangular shape compressed between the upper and lower implant bodies. A bit engaging socket is located within the forward end open interior and seats over the hex bit portion for controlling the displacement of the spinal jack halves.

Upon initial linear seating of the implant pockets to the spinal processes, such including exerting forward impact forces upon the tool for resistively seating the gripping pockets to the spinal processes, a rear handle end of the tool is removed to reveal a rear projecting end of a tool bit driver extending within the tool interior to the forward located bit engaging socket, such that the rotation of the rear driver rotates the hex bit to initiate separation of the upper and lower implant bodies.

The present invention also contemplates reconfiguring the implant body for other non-vertebral applications, such as in use with first and second segmented bones associated with any of a humerus, femur or the like. In this instance, the U shaped vertebral process seating pockets are reconfigured as inner elongated bodies which seat within the marrow interiors of the elongated bone segments for bonding the upper and lower body portions to the opposing end faces of the bone segments.

BRIEF DESCRIPTION OF THE DRAWINGS

Reference will now be made to the attached drawings, when read in combination with the following detailed description, wherein like reference numerals refer to like parts throughout the several views, and in which:

FIG. 20 is a further succeeding view to FIG. 19 and depicting a rotation of the rear driver in order to rotate the hex bit to initiate separation of the upper and lower implant bodies;

FIG. 21 is an enlarged view of forward area 21 of the implant tool depicted in FIG. 20 and depicting the rotating expansion of the upper and lower spinal body portions;

FIG. 33 presents a perspective environmental of a further version of an implant for non-vertebral applications, such as in use with first and second segmented bones associated with any of a humerus, femur or the like;

DETAILED DESCRIPTION OF THE PREFERRED EMBODIMENTS

With reference to the attached illustrations, the present invention discloses a variety of implant devices utilizing an expandable worm gear mechanism for providing incremental and secure adjustability in order to define a desired spatial separation distance between first and second bones. As will be described, and in a first application, an adjustable spinal jack is provided for installation between superior articular processes of upper and lower succeeding vertebrae. In a further non-limiting application, the implant can be redesigned to define a spatial separation distance between first and second bone segments, such as associated with a femur, humerus or the like. In any application, the present invention provides an expandable spinal jack which overcomes many of the disadvantages of the prior art and provides an effective solution for stabilizing a given orientation established between the first and second bone, processes or bone segments.

As will be further described, the spinal jack designs described herein further permit adjustment, at any future time following initial surgical implantation, in a minimally invasive fashion and in order to re-adjust the spatial positioning established between the upper and lower separable halves or sections, such as in order to compensate and correct for future/downstream vertebral complications following the initial implantation of the spinal jack.

Figure 1:
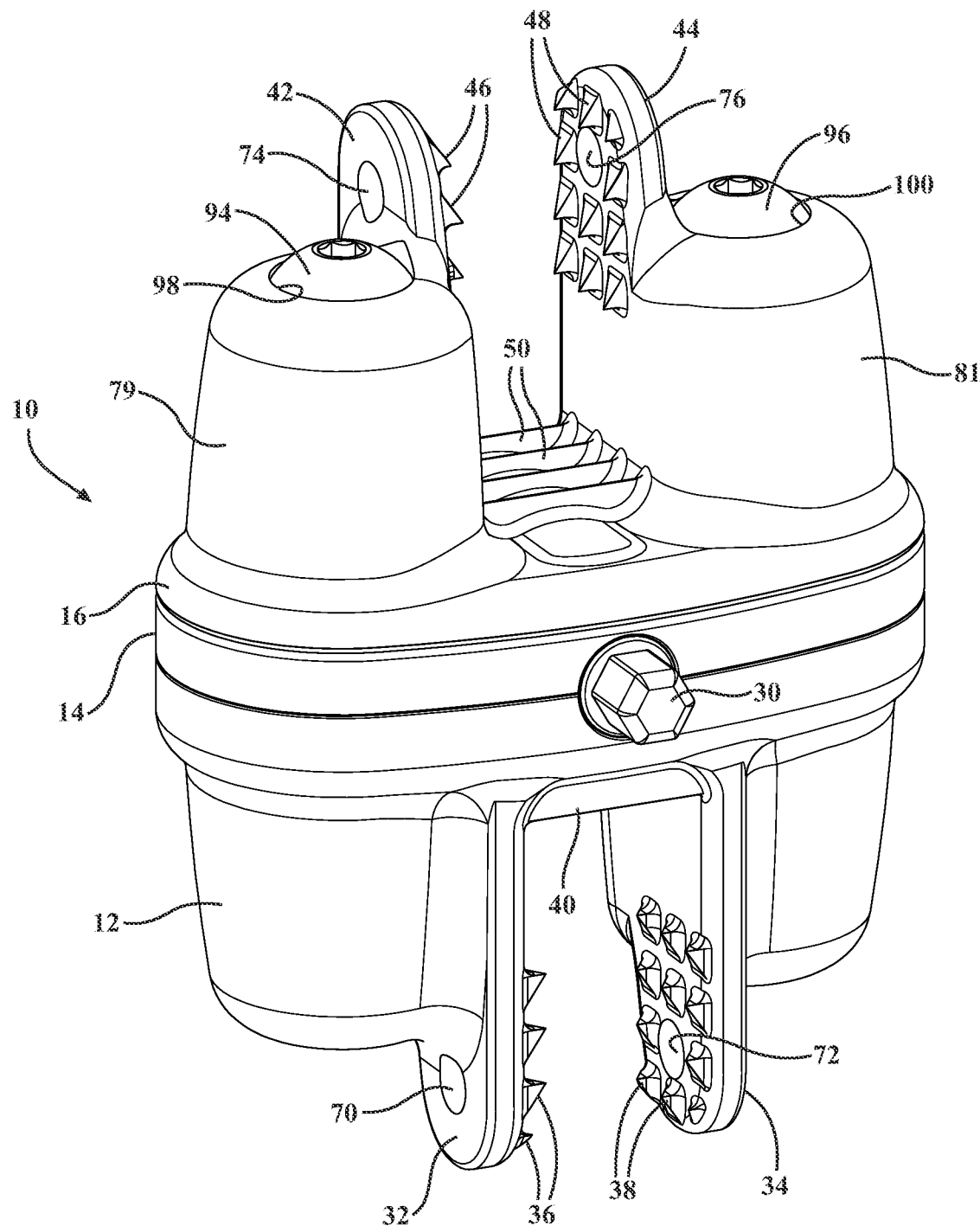
FIG. 1 is a perspective view of a spinal worm screw jack according to one non-limiting variant and having upper and lower body portions shown in a retracted position prior to being installed between succeeding superior articular processes associated with upper and lower consecutive spinal vertebra.
Figure 8:
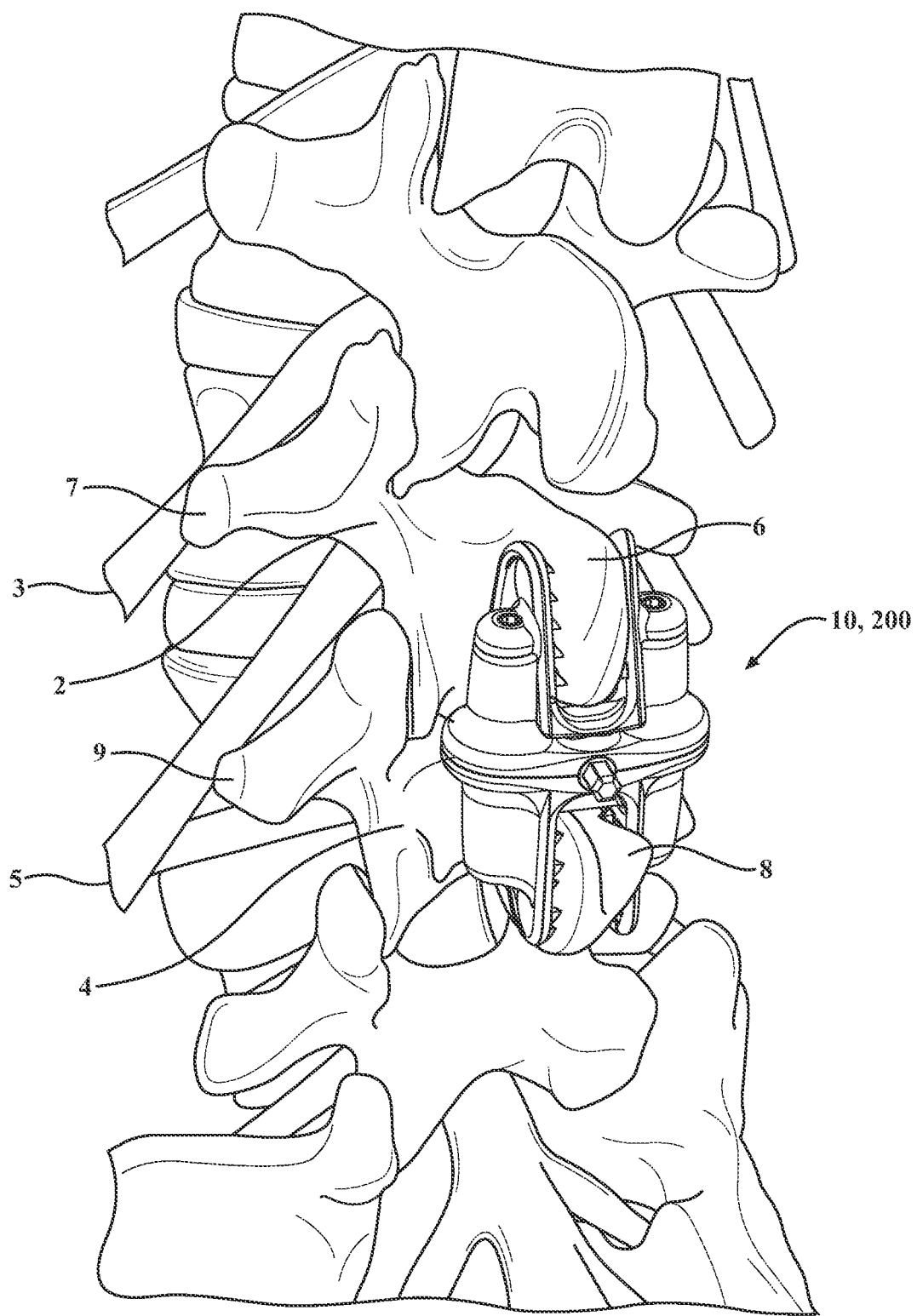
FIG. 8 is an environmental view depicting the spinal jack installed between a pair of succeeding spinal vertebrae according to one non-limiting application of the present invention.

Proceeding to FIG. 1, an illustration is generally shown of a jack implant 10 shown in a retracted position according to a first spinal implant configuration. As depicted in FIG. 8, an environmental view is shown depicting the spinal jack (such as at 10 or 200 according to alternating embodiments) installed between a pair of succeeding spinal vertebrae 2 and 4 according to one non-limiting application of the present invention. As shown, the vertebrae 2 and 4 each include an arrangement of processes, including spinous processes 6 and 8 to which the implant can be mounted. Without limitation, the implants can also be reconfigured to mount to succeeding transverse processes (see at 7 and 9 respectively) associated with the vertebrae 2 and 4.

As is known, vertebrae are bones located within the vertebral column which, in humans, encompass a series of thirty three bones that run from the base of the skull to the coccyx (not shown). As is further known, the irregularly shaped bones form the roughly S-shape of the spinal cord. Between each vertebra is an intervertebral disc, which helps provide shock absorption and protect the vertebrae.

At the base of the skull, the vertebral column starts with the cervical vertebrae. There are seven of these, numbered C1 through C7, which allow the neck the full range of motion they have. The thoracic vertebrae are the next vertebrae, larger than the cervical vertebrae, and moving down the spinal column, these articulating with the ribs, helping to protect the chest cavity containing the heart and lungs. The next five vertebrae are the lumbar vertebrae, the largest and greats weight supporting of the vertebrae, producing a natural curvature to the spine. Lumber vertebrae further allow for flexion, extension, and side-bending.

The remaining vertebrae are the five vertebrae that form the fused sacrum, as well as the three to five vertebrae that form the coccyx or tailbone. The sacral and coccygeal vertebrae do not have intervertebral discs. These bones are sometimes referred to as the caudal vertebrae and have the most variation in number, with some species having a few and others having numerous caudal vertebrae.

As is also depicted in FIG. 8, the vertebrae provide attachment points for muscles and ligaments, allowing many of the motions that the body is able to go through, such as bending and twisting. The vertebrae also protect the spinal cord, which runs down openings in the vertebrae (branches of the spinal cord being shown at 3, 5 et seq.). As a result of this protection, the risk of damage due to trauma and everyday activities is minimized. Also, openings known as foramina are provided which allow the spinal nerves to pass through, providing nervous innervation to different tissues.

Figure 4:
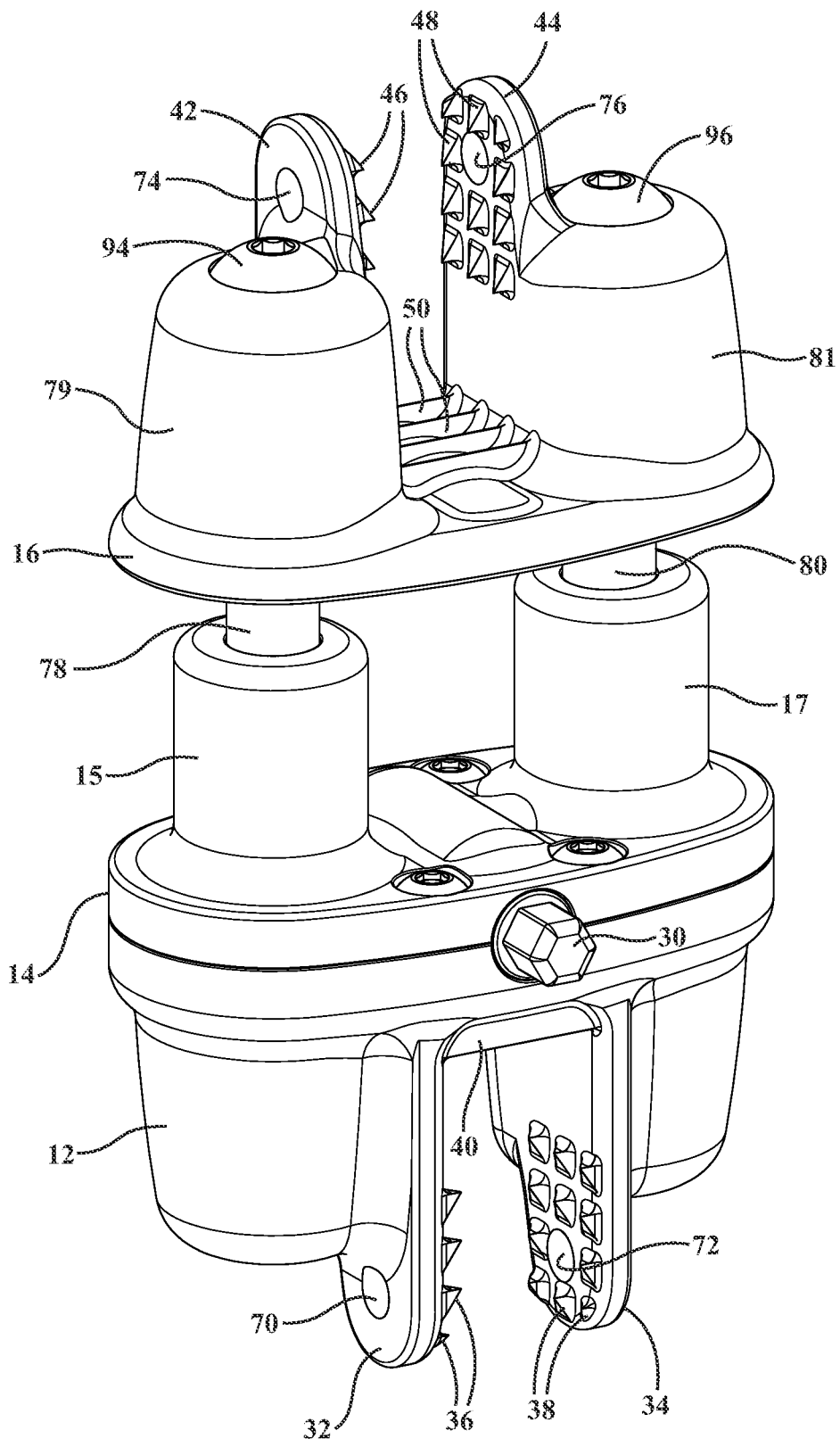
FIG. 4 depicts the spinal worm screw jack of FIG. 1 in an outwardly expanded position.
Figure 5:
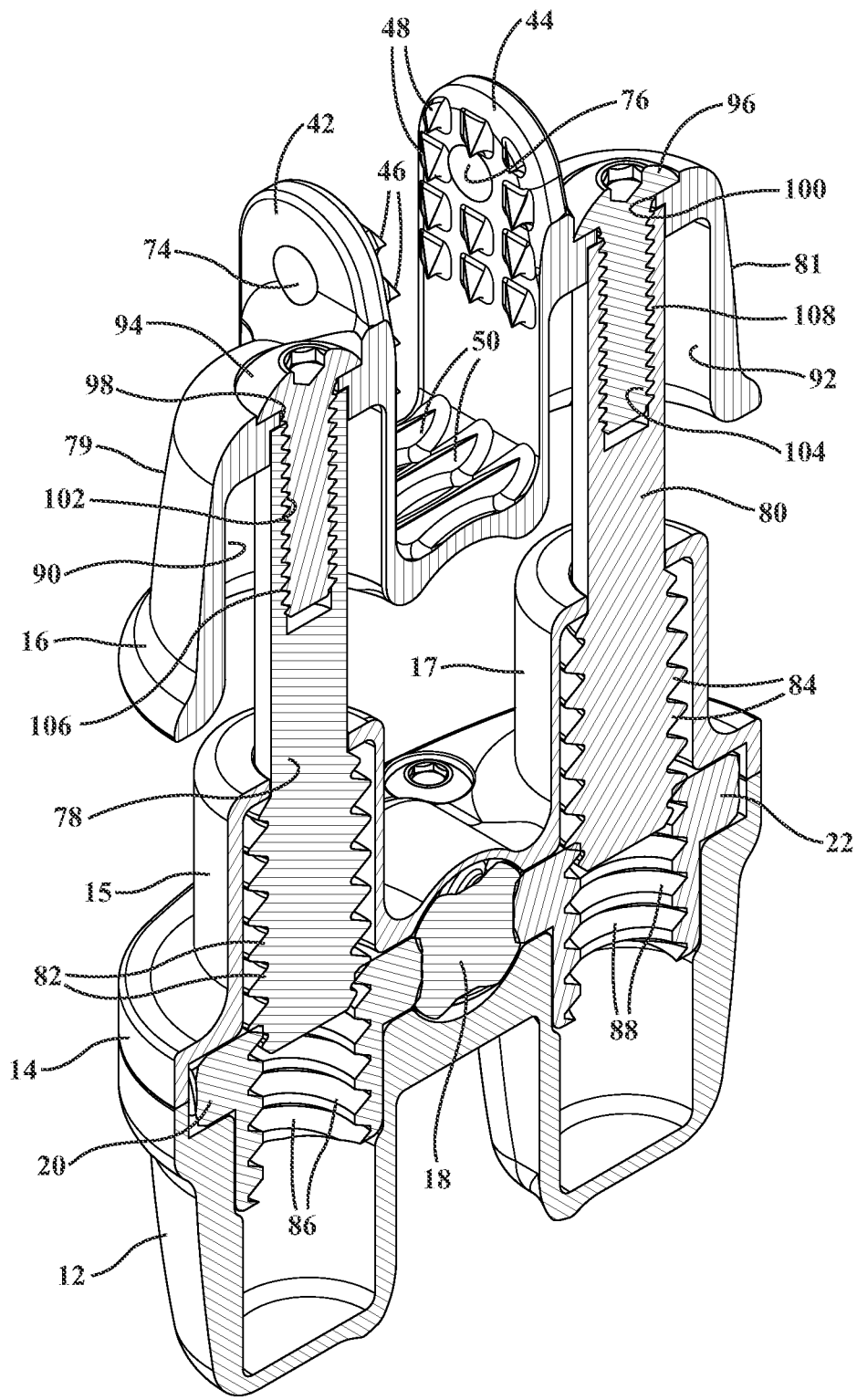
FIG. 5 is a cutaway view taken along line 5-5 of FIG. 4 of the screw jack bodies and worm screw gearing in the expanded position.
Figure 7:
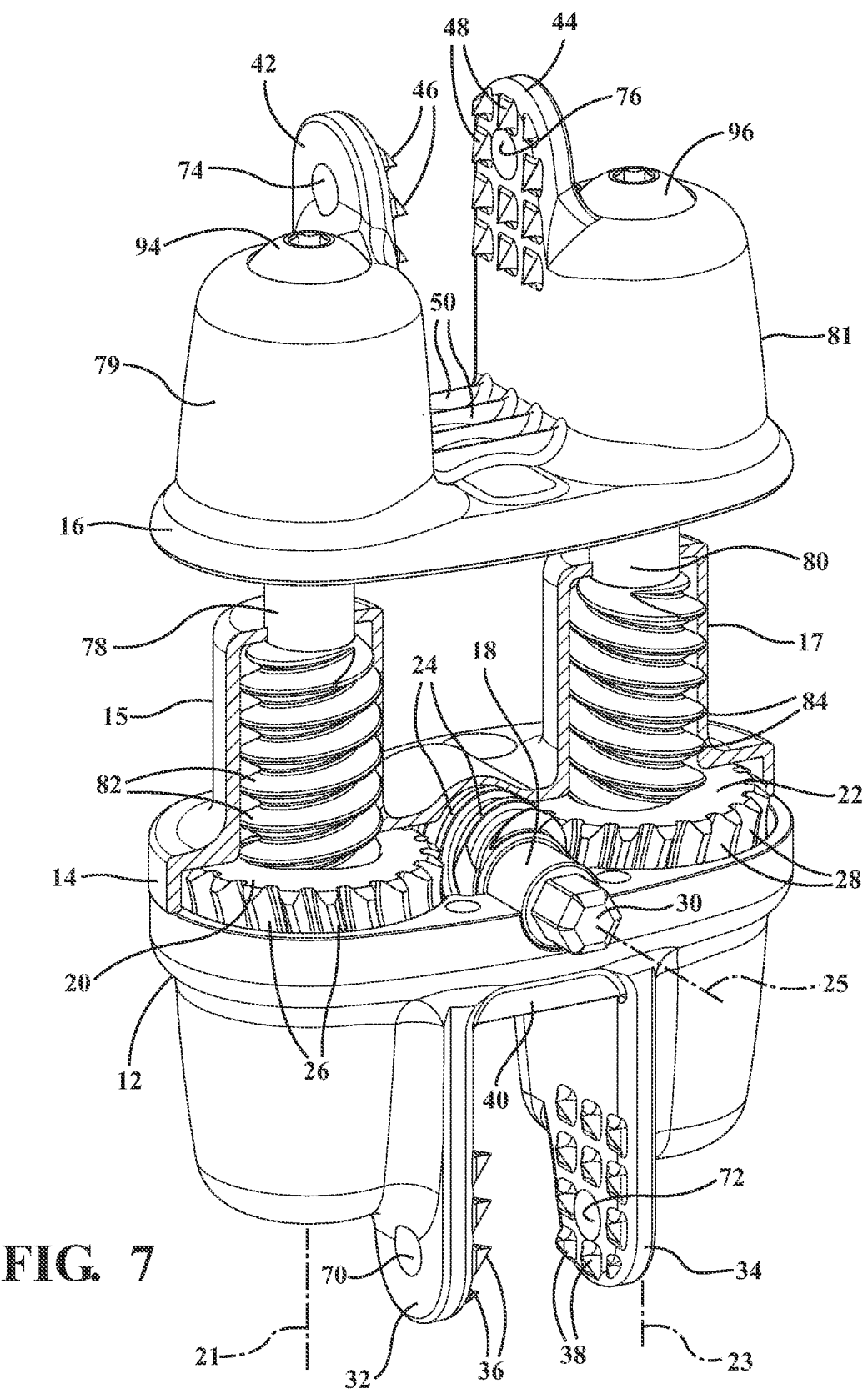
FIG. 7 is an illustration similar to FIG. 4 and depicting an intermediate cutaway region associated with the lower body for revealing the input hex input worm screw, outer slaved worm gears and coaxially inter-rotating and axially displacing screws provide for fine incremental adjustment of the respective half halves.

In combination with the expanded positions of FIGS. 4, 5 and 7, the spinal jack can be provided in a set of varied sizes for implantation into each of the cervical, thoracic and lumbar sections. In each instance, the implant or jack 10 includes a three dimensional and arcuate ergonomic lower body portion constructed from first 12 and second 14 subset body portions, from which is displaceable an upper body portion 16 (as best shown in FIG. 4). The subset body portion 14 further includes superstructure portions 15 and 17. The body portions, as will be further described, can be machined, injection molded or additive printed. Interior components of the worm gear mechanism, supporting and displacement stems and the like can also be provided as any machined or stamped construction not limited to material composition however typically including a medical grade sanitary material not limited to titanium.

The subset lower body portions 12/14 and upper displaceable body portions 16 are each constructed of a suitable sanitary medical grade material not limited to any of a metal (e.g. typically titanium) or other plastic composition. As will be further described in subsequent variants, the upper body portion 16 and subset lower body portions 12/14 can be individually three dimensionally (3D) or additive printed, permitting greater detail and material variation (e.g. surface latticing as will be further described) than which is capable with other existing forming (e.g. stamping and molding) techniques.

As best shown in the cutaway view of FIG. 7, the subset assembled lower body portions 12/14 (which can be sonic welded or otherwise secured) define a package interior space for collectively seating a worm gear mechanism including each of a central worm gear 18 and inter-engaging and rotationally actuated outer located gears 20 and 22. The outer gears 20/22 are arranged so that a rotational centerline axis of each (see at 21 and 23 in FIG. 7) is arranged in a perpendicular direction relative to a rotational centerline (further at 25) of the central worm gear 18.

As shown in FIG. 4, the central worm gear 18 includes a spiral array of gear teeth 24 extending along its generally horizontal length which mesh with the crosswise arranged and annular arrayed gear teeth, shown at 26 arranged upon outer gear 20 located on one side of the worm gear 18, and further at 28 arranged upon the other outer gear 22 arranged on the opposite side of the worm gear 18. A projecting hex bit portion 30 is integrally formed with an axial end of the central worm gear 18 and which seats within and (optionally) projects forwardly from aligning annular rim portions (see at 31 and 33 in FIG. 3 cutaway) defined between the opposing end faces of the subset body portions 12/14.

In this fashion, a socket style tool bit (reference being subsequently made to the implantation tool shown in FIGS. 18-21) can be easily attached to the projecting hex portion 30 of the driving worm gear 18 for actuating the worm gear 18 and meshing outer beveled gears 20/22. The present invention contemplates any bit configuration for rotating the central worm gear 18, such including without limitation the hex key profile as depicted. It is also advantageous, although not limiting to the present invention, to have the worm gear bit project from the surface of the main jack body in order to enable easier in situ access and adjustment such as following an initial surgical implantation.

Each of the subset body portions 12/14 also depict gripping surfaces configured as inwardly contoured or recessed pockets for receiving the consecutively arranged superior articular processes. A first lower pocket is configured in the lower positioned subset body portion 12 and is defined by a pair spaced apart extending sides or tabs 32/34, each further exhibiting opposing side surface gripping or teethed portions 36/38 and a series of further inside middle gripping locations 40 for configuring a first superior articular process receiving pocket.

As shown, the upper body 16 includes similar upper recessed gripping surfaces forming a pocket defined by a further pair of spaced apart sides 42/44, each further exhibiting opposing side surface gripping teeth 46/48 and additional inside middle gripping locations 50 for configuring a second superior articular process receiving pocket. As described, the spaced apart pairs of sides or tabs 32/34 and 42/44 of the opposite extending gripping portions are adapted to seat upper and lower consecutive superior articular processes.

Figure 2:
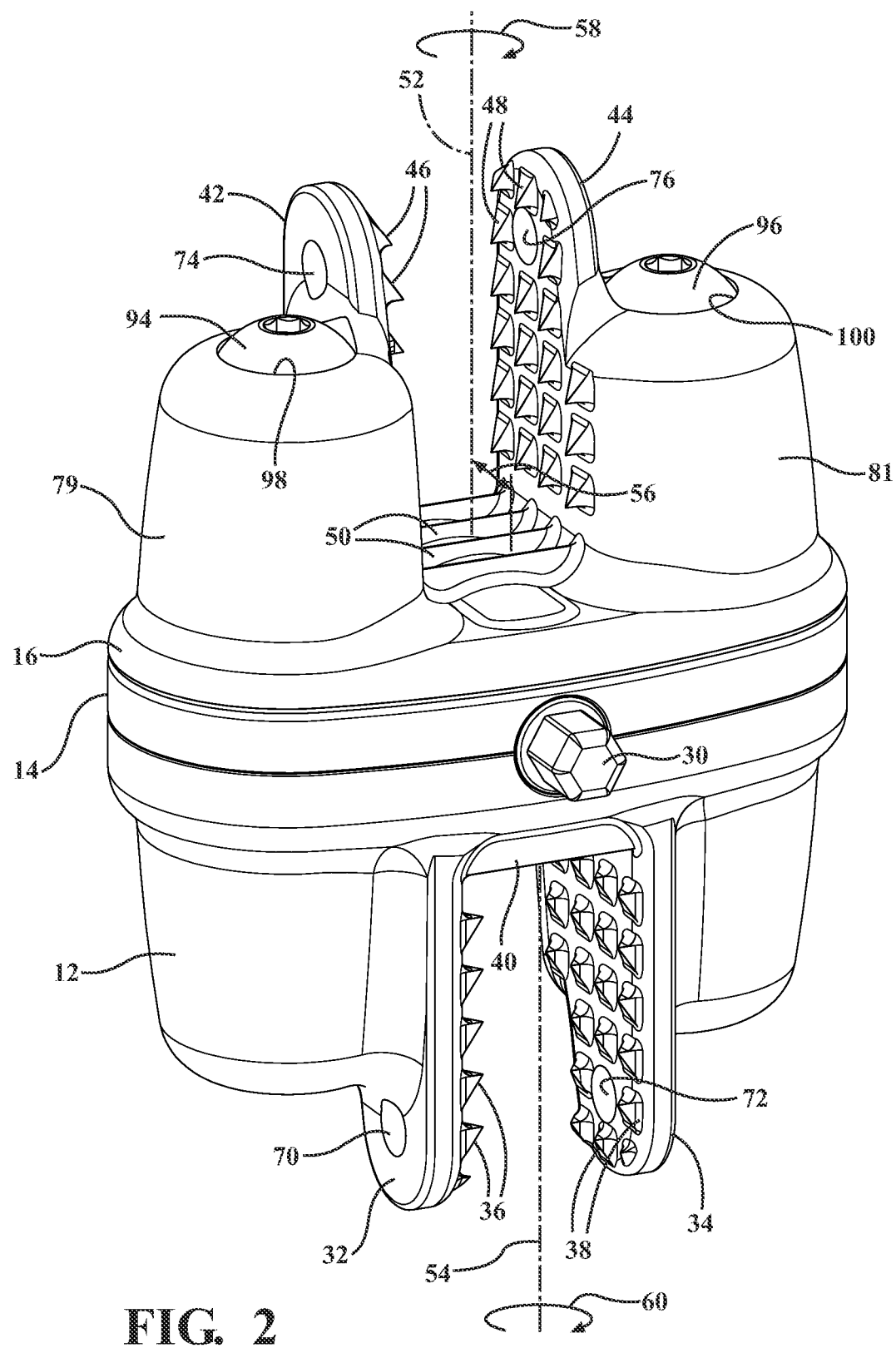
FIG. 2 is a similar perspective view to that shown in FIG. 1 of a variant of spinal worm screw jack exhibiting increased distribution of unidirectional gripping teeth exhibited upon upper and lower "U" shaped channel defining gripping surfaces.

As shown, the arrangement of the inward facing teeth 36/38 configured upon the lower tabs 32/34, along with opposing teeth 46/48 of the upper tabs 42/44 provide for unidirectional insertion of the process within the "U" shaped channels in a manner which prevents reverse withdrawal or detachment. As best shown in the illustration of FIG. 2, a pair of elongated axes 52 and 54 are depicted which extend through axial centerline locations of each of the upper 42/44 and lower 32/34 pairs of tabs.

As further shown, these centerline axes 52/54 are separated by a horizontal depth 56, the significance of which is that inward compressing forces exerted by the superior articular processes (see as further represented in FIG. 2 by upper 58 and lower 60 inward opposing rotational movements) against the upper and lower jack body portions results in an inward rotating movement exerted upon the channel defining pairs of tabs 32/34 and 42/44, with the further result being that detachment of either or both of the processes from the jack bodies or halves is better avoided. In combination, the configuration and arrangement of the tab surface mounted teeth 36/38 and 46/48 contribute to providing additional gripping and retaining resistive engagement against the facet surfaces of the processes.

Figure 6:
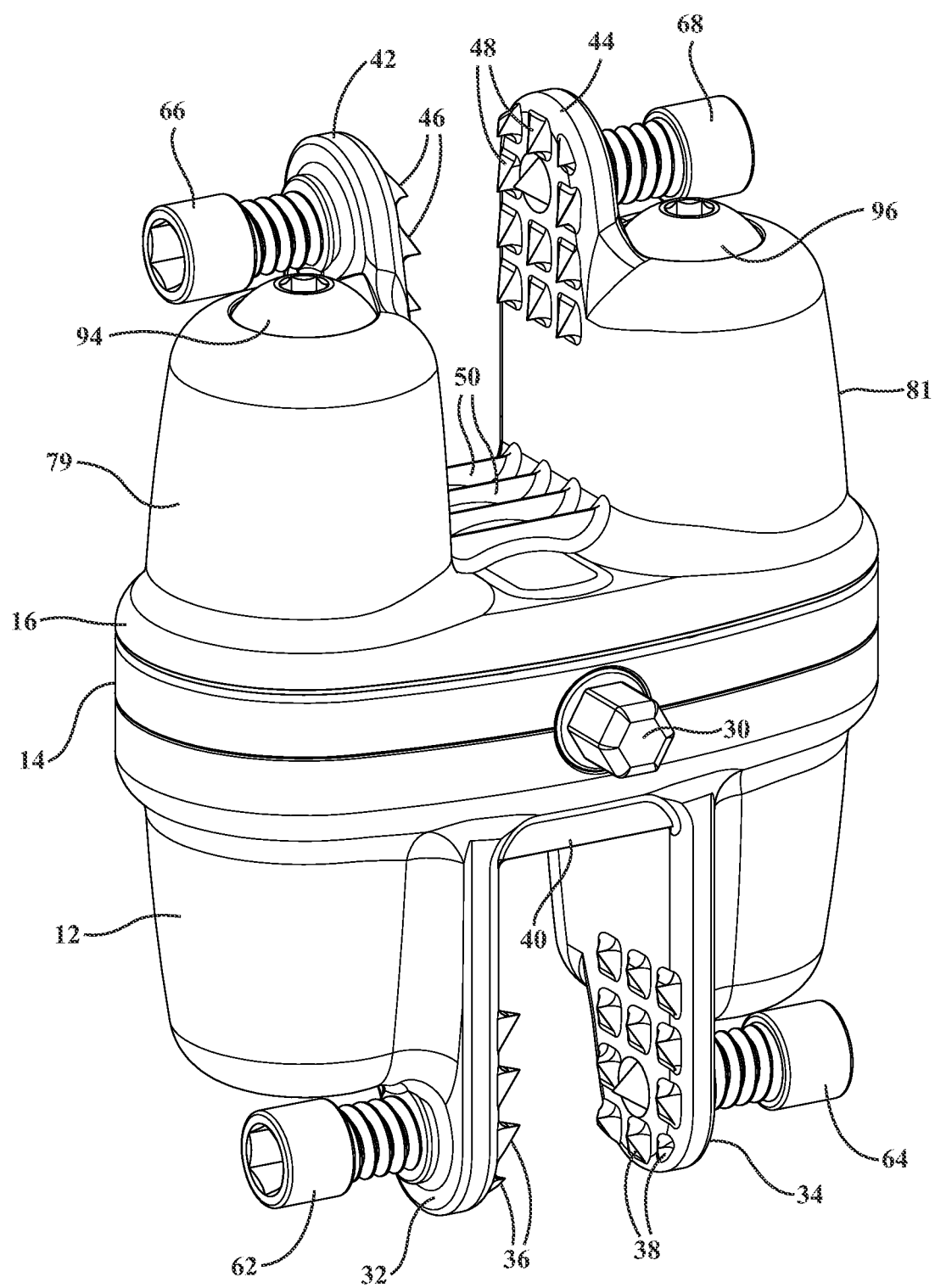
FIG. 6 is an illustration similar to FIG. 1 and showing the tabs associated with the upper and lower jack body gripping portions receiving inwardly directed screws or push in clips for anchoring to the articular processes.
Figure 17:
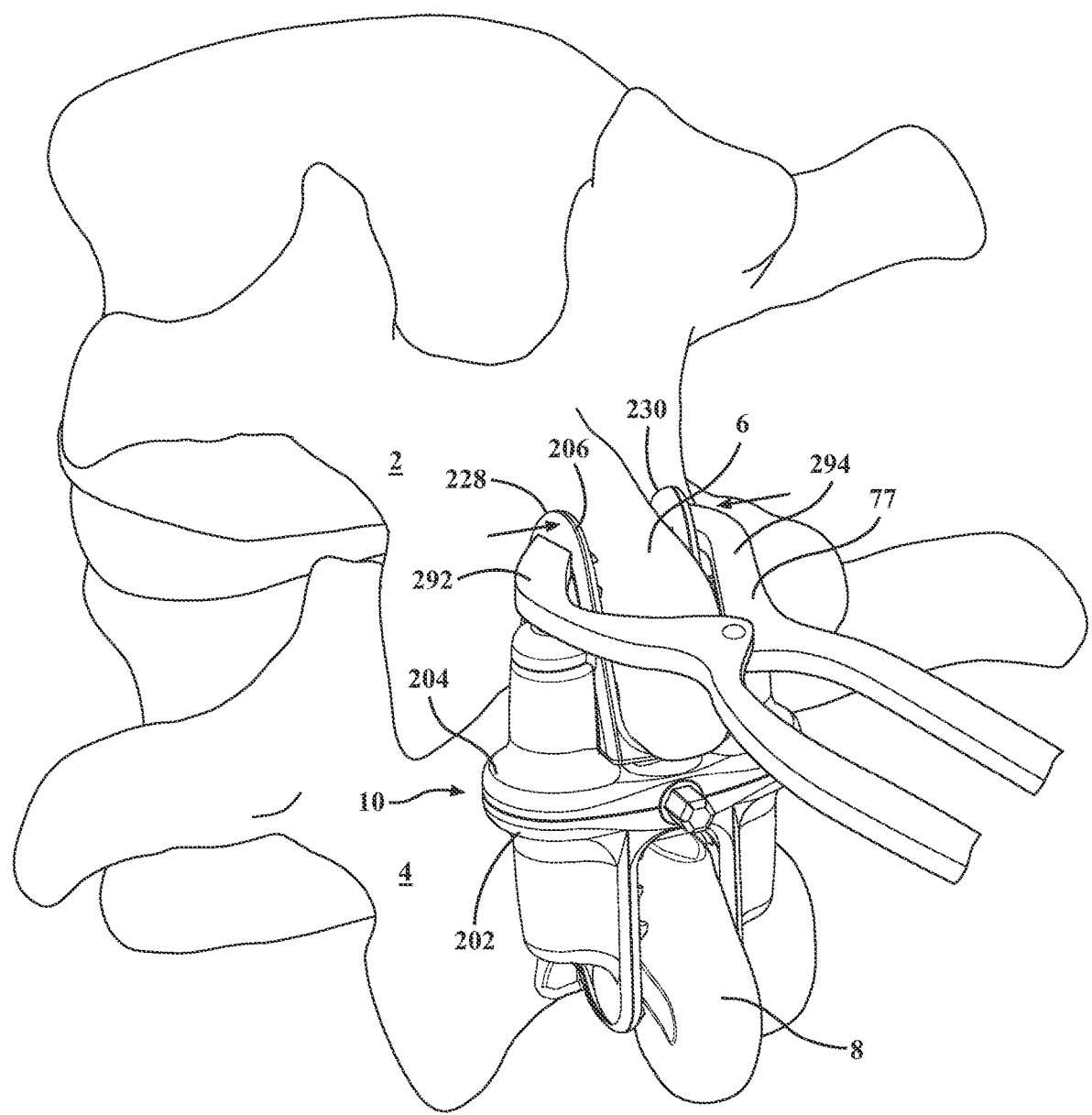
FIG. 17 is an environmental illustration similar to that shown in FIG. 8 and depicting a crimping option for deforming and affixing the extending tabs defining each of the upper and lower gripping pockets against the spinous processes, such as additionally or alternative to the use of mounting fasteners of FIG. 9.

Any type of screw fastener (such as shown by lower pairs 62/64 and upper pairs 66/68 of hex socket head screws in FIG. 6) is employed with each gripping portion and which, upon attaching through pairs of apertures 70/72 and 74/76 formed through the spaced apart pairs of tabs 32/34 and 42/44, provides for anchoring the lower and upper jack halves to the respective vertebral processes. It is further envisioned that alternately configured screws (including a single elongated upper and lower screw drilled through the attached processes and including the tubular shaped rivets depicted in subsequent FIG. 9 et seq.) or push in clips (not shown) can be utilized. Alternatively, the gripping portions defining each pocket can be provided without aligning apertures (see FIG. 1) and which can be crimped into engagement with the vertebral processes 2 and 4, such as without the use of separate screws. This is best depicted in the alternate environmental mounting configuration of FIG. 17 depicting a pair of pliers 77 for inwardly crimping and deforming the pairs of tabs 32/34 and 42/44 to engage the spinous processes 6 and 8 (this with or without the additional use of the mounting fasteners).

Figure 3:
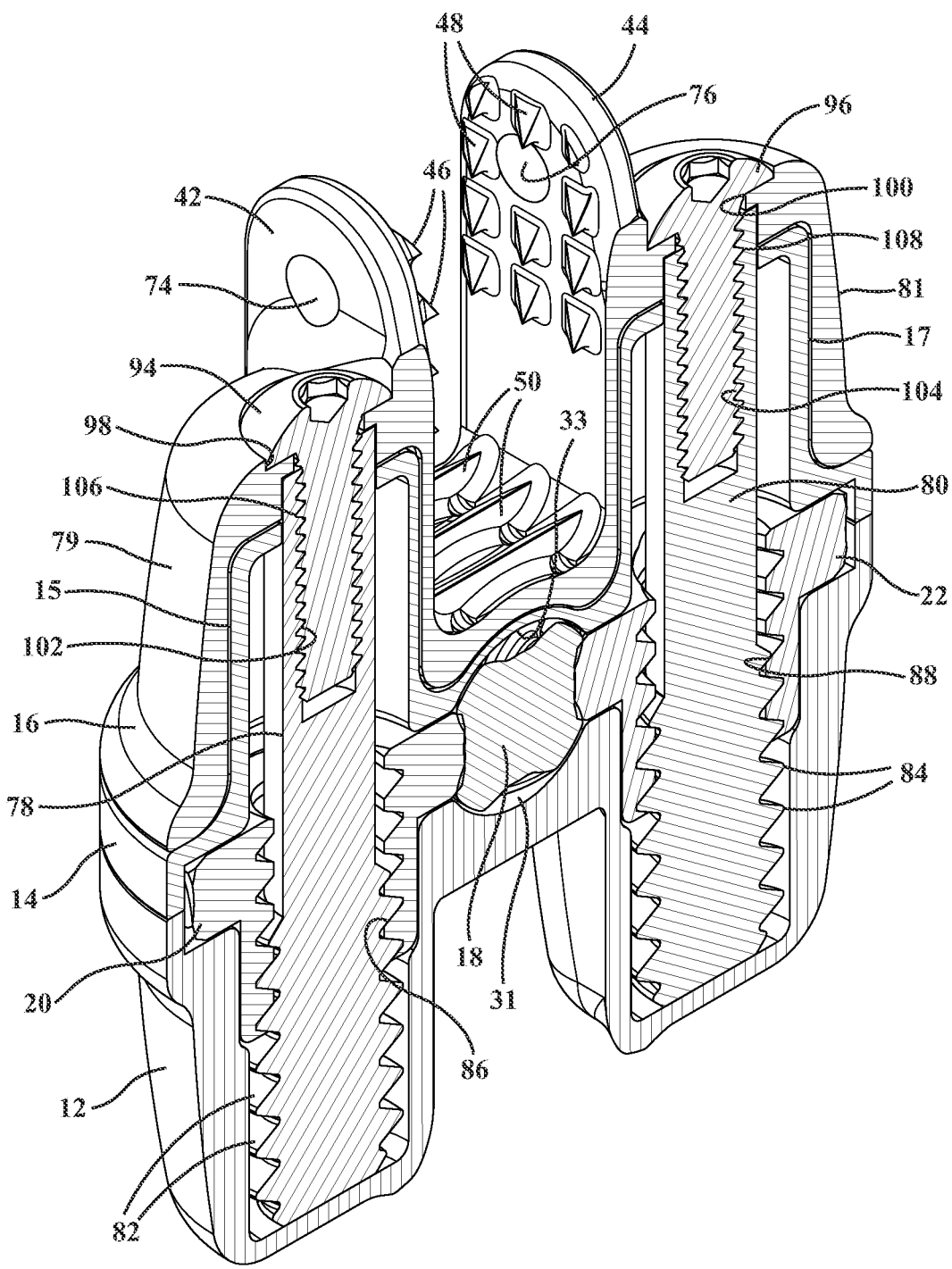
FIG. 3 is a cutaway taken along line 3-3 of FIG. 1 and depicting the interior worm screw and gearing for separating the upper and lower bodies and including the input worm screw, outer slaved worm gears and coaxially inter-rotating and axially displacing screws provide for fine incremental adjustment of the respective half halves.

As best shown in FIGS. 3-5 and 7, the afore-described elongated stems 78/80 include upper ends anchored to outer superstructure locations 79 and 81 of the upper body portion 16, these in turn nesting over the superstructure portions 15 and 17 of the subset body portion 14 (see as best shown in FIG. 3).

As depicted in one non-limiting embodiment, the stems 78/80 each include outward spiraling threads 82 and 84 which are coaxially interiorly supported within opposing interior threads 86 and 88 associated with the outer bevel gears 20 and 22. The upper ends of the stems 78/80 extend within the hollowed and bell shaped interiors (see at 90 and 92 in the cutaway of FIG. 5) associated with the superstructures 79/81 of the upper jack half body 16.

As best shown in the cutaway views of FIGS. 3 and 5, a pair of screws 94 and 96 can install downwardly through upper end aperture receiving locations 98 and 100 formed in the bell shaped superstructure portions 79/81 of the upper jack half body 16. In one non-limiting option, the upper extending ends of the stems 78/80 have interiors which are open and include threads 102/104 which receive exterior threads 106/108 disposed on the stems of the screws 94/96 in order to elevate the upper jack body 16 (see FIGS. 4-5) in response to rotational actuation of the central worm gear 18 via the projecting hex bit portion 30.

Figure 18:
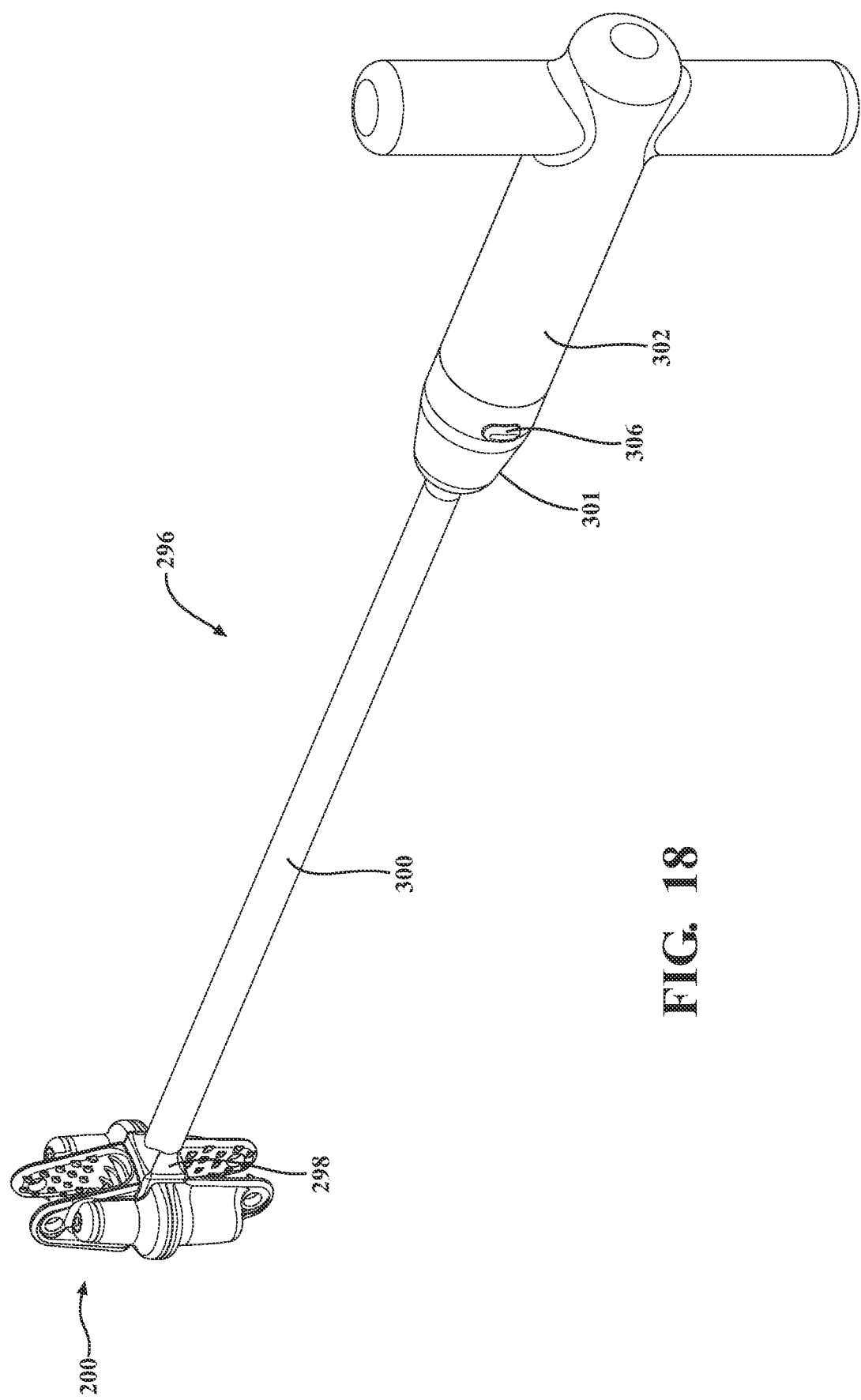
FIG. 18 provides a perspective of an installation tool which provides for locating and resistive seating of the spinal implant against the spinal processes of the successive vertebrae, such that, and upon initial linear seating of the implant pockets to the spinal processes, exerted impact forces upon the tool resistively seating the gripping pockets against the spinal processes, whereupon a rear handle end of the tool is removed to reveal a rear projecting end of a tool bit driver extending within the tool interior to the forward located bit engaging socket, with successive rotation of the rear driver rotating the hex bit to initiate separation of the upper and lower implant bodies.

In this fashion, and upon pre-positioning and initial attachment of the spinal jack 10 between the succeeding superior articular processes, an external tool bit (such as again a socket associated with the implantation tool of FIG. 18) engages the projecting hex bit 30 of the central worm gear 18 and further, upon being rotated in a selected rotational direction, results in the outer bevel supported gears 20/22 being rotated. Simultaneously, the inner spiral threads 86/88 of the outer gears 20/22 in turn actuate the inter-engaged threads 82/84 of the stems 78/80 in order to elevate the stems and upper end supported spinal jack body 16.

In this manner, the stems 78/80 are elevated along with the upper supported and process engaging body 16 relative to the assembled subset portions 12/14 of the lower main body. As again best shown in FIG. 5, interior pockets 110/112 can be defined in the lower body portions 12/14 for seating extending displaceable ends of the stems 78/80 in a manner allowing a desired degree of travel relative to the outer gears 20/22 for bi-directional adjustment of the upper spinal jack half 16 relative to the inter-assembled lower spinal jack half 12/14.

Although not shown, it is envisioned and understood that additional spinal braces and the like can be provided (not shown) which can be installed against the lateral processes of each vertebrae and in order to provide additional vertebral support depending upon the nature of the spinal injury being addressed. The construction of the worm gear arrangement of the present invention also provides the ability to make minute or fine incremental adjustments to the jack bodies, and without the requirement of implementing further anti-reverse motion locking mechanisms for preventing inadvertent reverse inward adjustment in response to compressive forces exerted by the spinal processes on the jack halves.

Accordingly, the present invention provides a number of unique features not present in other competing spinal jack devices. These include modifying the gripping teeth design beyond those depicted in the attached illustrations and which can include any alternate design, pattern, facet arrangement or the like for facilitating unidirectional (slide in) insertion, along with frictional resistance to reverse direction withdrawal or disengagement of the jack from the superior articular processes.

Beyond the protruding hex bit portion illustrated, it is further understood and anticipated that other bit engaging profiles can be provided for receiving a suitable adjustment tool, such as post initial implantation within the patient and during a subsequent adjustment of a spatial distance between the succeeding articular processes supported by the jack. Other features include any arrangement of side screws or pushpins, such as two or four, provided in any style or amount.

The use of a worm and worm gear design is also understood to prevent inadvertent or reverse inward adjustment of the jack halves, such as in response to compressive forces exerted between the articular processes. In this fashion, the worm/worm gear jack design of the present invention can be optionally provided without the need for additional restraining or locking mechanisms for preventing undesirable compressive adjustment in situ within the patient.

Other features include the stepped or depth offsetting design of the oppositely directed upper and lower jack bodies which again create inwardly directed moment forces in response to compression by the spinal processes on the attached jack. In this fashion, the "U" shaped design of the jack halves is caused to inwardly compress or tighten in response to the compressive applied loads, and as opposed to outward directed momentum forces which would tend to detach the jack halves from the attached spinal processes.

Figure 9:
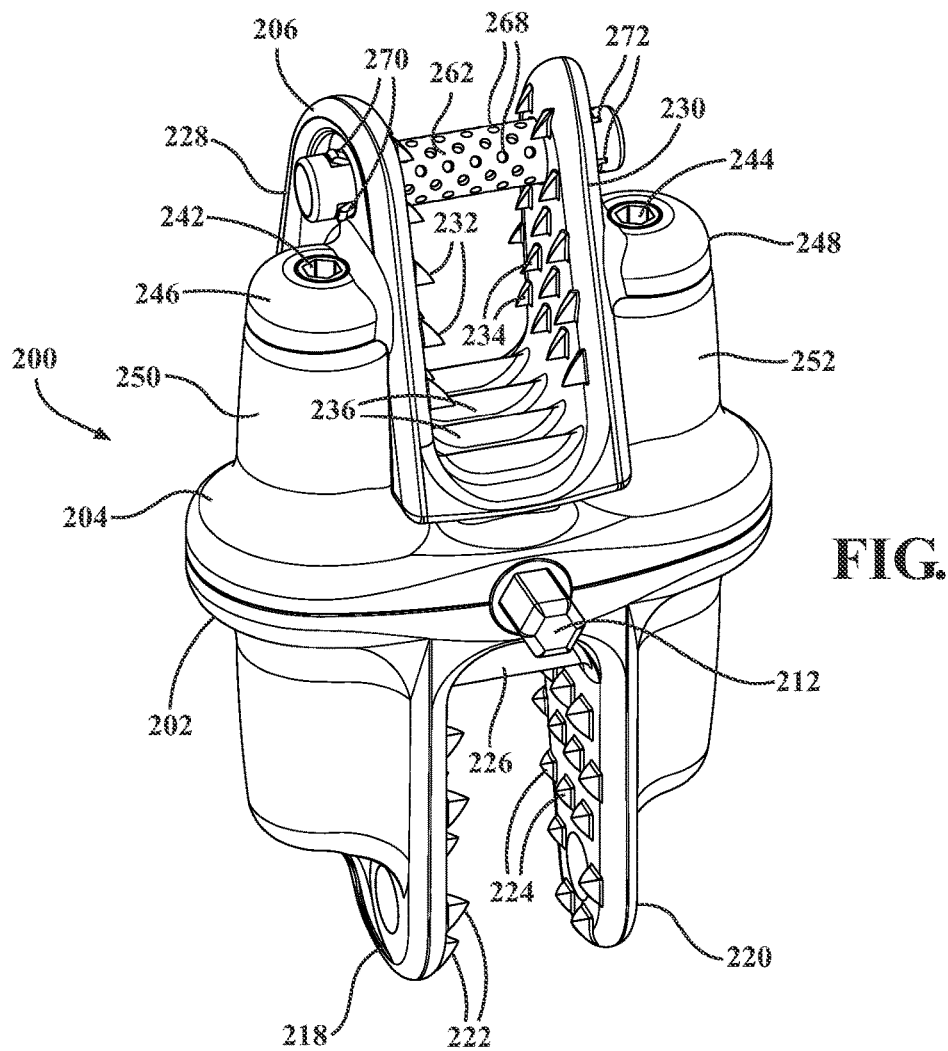
FIG. 9 a perspective view of a spinal worm screw jack according to a further non-limiting variant depicting the first and second body portions shown in a retracted position, as well as depicting a tubular shaped mounting rivet for securing through aligning apertures formed in spaced apart and gripping pocket defining tabs associated with an upper selected of the spinal jack body portions, the rivet exhibiting in-growth promoting apertures when engaged through the spinal vertebrae process depicted in FIG. 8.
Figure 29:
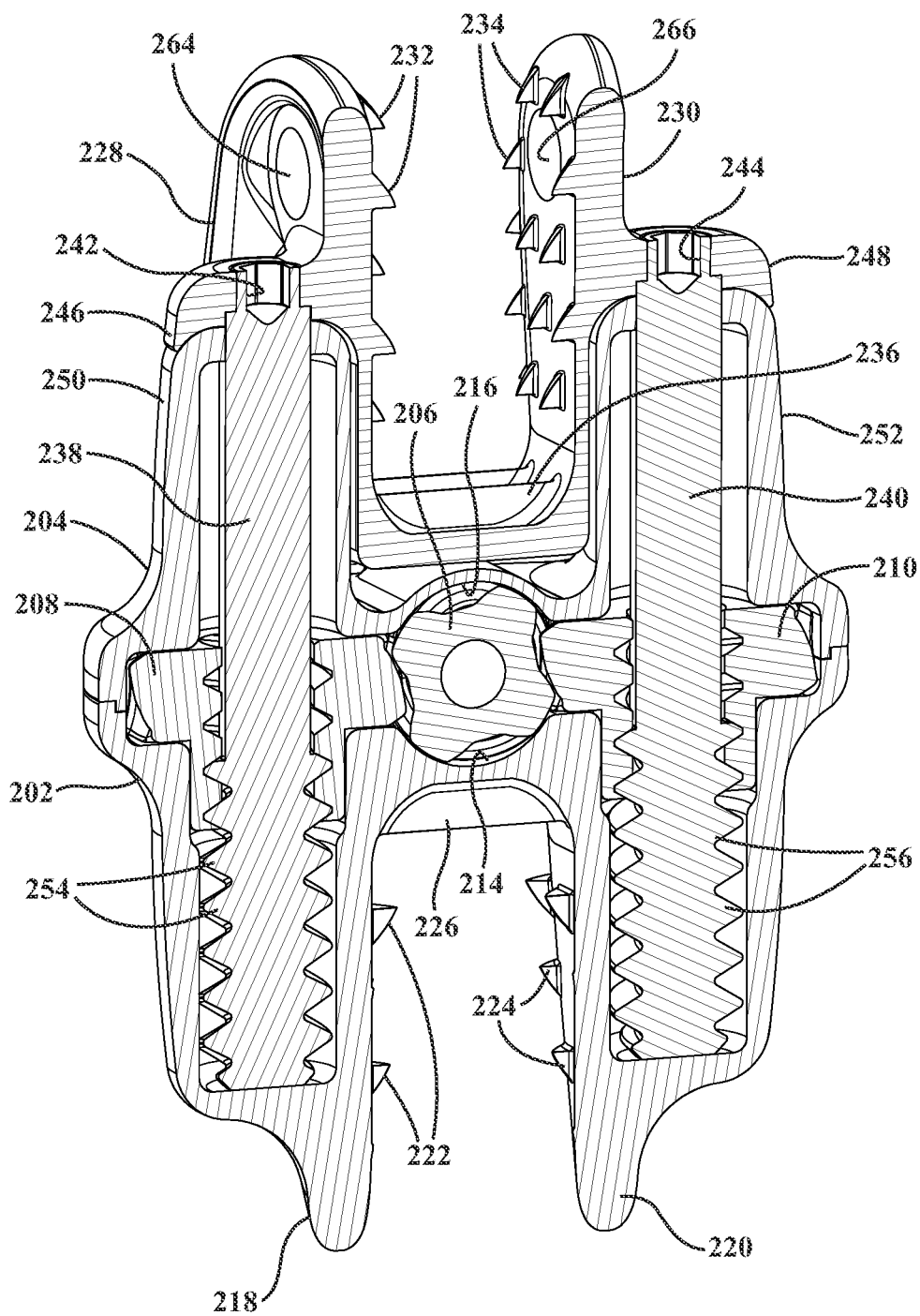
FIG. 29 presents a further perspective and vertical cutaway of the spinal implant jack according to the present invention in a fully closed position.
Figure 30:
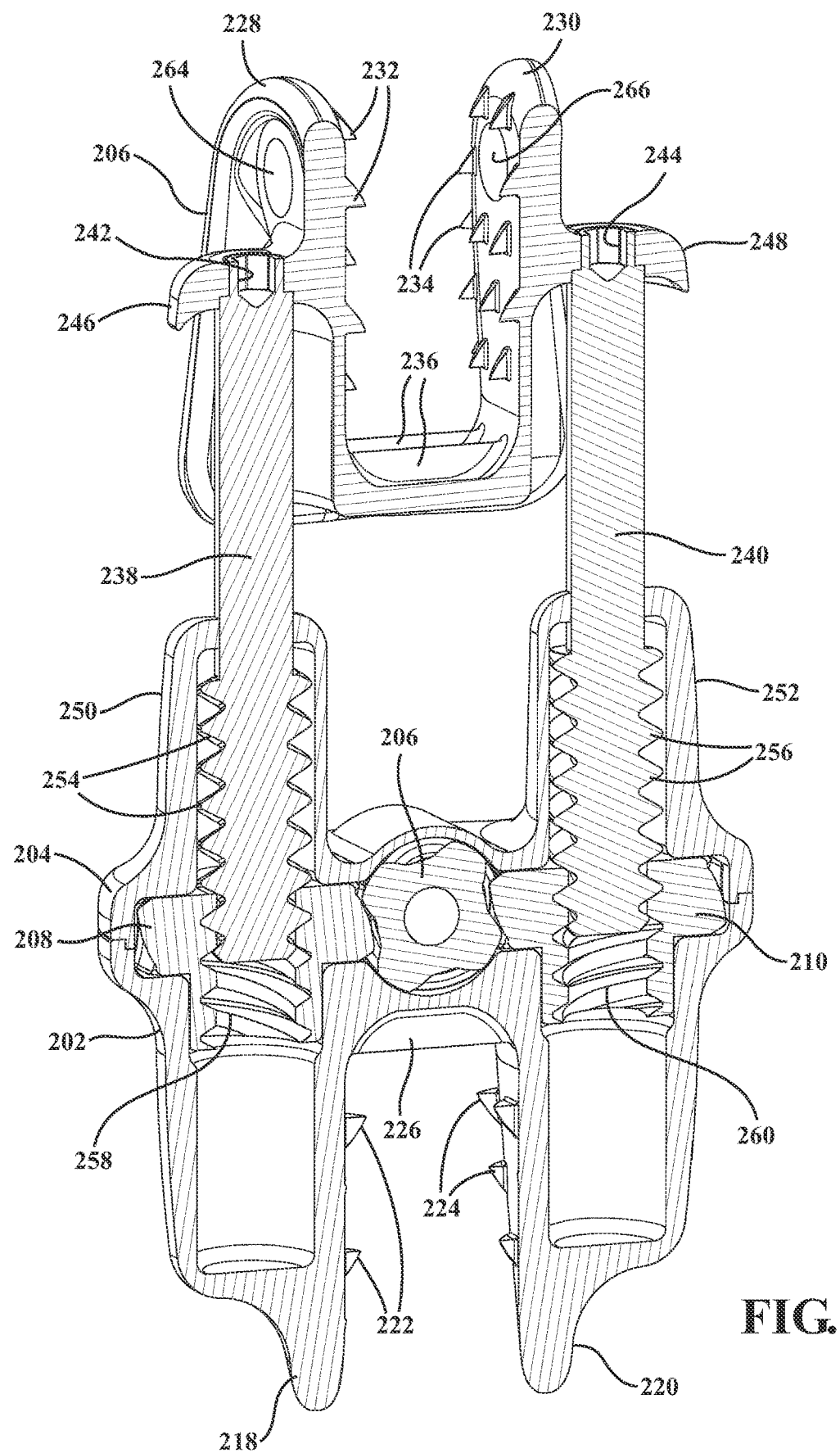
FIG. 30 is a succeeding view to FIG. 29 depicting the upper and lower spinal implant body portions in a substantially expanded configuration.

Proceeding now to FIG. 9, a perspective view is generally shown at 200 of a spinal worm screw jack according to a further non-limiting variant and again depicts the first and second body portions shown in a retracted position. As further best shown in the cutaway views of FIGS. 29-30, the lower or main body is reconfigured as subset body portions 202 and 204, along with a redesigned upper body portion 206.

The subset lower body portions 202/204 and upper displace-able body portions 206 are again each constructed of a suitable sanitary medical grade material not limited to any of a metal (e.g. typically titanium) or other plastic composition. The subset assembled lower body portions 202/204 can again be sonic welded or otherwise secured to define a package interior space for collectively seating a worm gear mechanism, further including each of a central worm gear 206 (see also FIGS. 1-7) and inter-engaging and rotationally actuated outer located gears 208 and 210 (again FIGS. 29-30). The outer gears 208/210 are likewise arranged so that a rotational centerline axis of each is arranged in a perpendicular direction relative to a rotational centerline of the central worm gear 206.

The central worm gear 206 again includes a spiral array of gear teeth (not shown in the variant of FIG. 9 with reference again being made to 24 in FIG. 7) extending along its generally horizontal length which mesh with the crosswise arranged and annular arrayed gear teeth, again previously referenced at 26 arranged upon each of the outer gears 208/210 which are arrayed on opposite sides of the central gear 206.

A projecting hex bit portion 212 is integrally formed with an axial end of the central worm gear 206 and which seats within and (optionally) projects forwardly from aligning annular rim portions (see at 214 and 216 in FIG. 29 cutaway) defined between the opposing end faces of the subset body portions 202/214.

As with the prior embodiment, each of the subset body portions 202/204 again depict gripping surfaces configured as inwardly contoured or recessed pockets for receiving the consecutively arranged superior articular processes (see again FIG. 8). A first lower pocket is configured in the lower positioned subset body portion 202 and is defined by a pair spaced apart extending sides or tabs 218/220, each further exhibiting opposing side surface gripping or teethed portions 222/224 and a series of further inside middle gripping locations 226 for configuring a first superior articular process receiving pocket.

As shown, the upper body 206 includes similar upper recessed gripping surfaces forming a pocket defined by a further pair of spaced apart sides 228/230, each further exhibiting opposing side surface gripping teeth 232/234 and additional inside middle gripping teeth 236 for configuring a second superior articular process receiving pocket. As described, the spaced apart pairs of sides or tabs 218/220 and 228/230 of the opposite extending gripping portions are adapted to seat upper and lower consecutive superior articular processes.

Elongated stems 238 and 240 are again provided (see again FIGS. 29-30) and include upper ends 242/244 anchored to outer support locations 246/248 of the upper displaceable body portion 206, these in turn seating over superstructure portions 250 and 252 of the subset body portion 204.

As previously described in the initial embodiment of FIGS. 1-8, stems 238/240 each include outward spiraling threads 254 and 256 which are coaxially interiorly supported within opposing interior threads 258 and 260 (FIG. 30) associated with the outer bevel gears 208 and 210. In this fashion, rotation of the hex bit 212 elevates the upper jack body 206 relative to the lower jack subset body portions 202/204 in like fashion as previously described in the first embodiment 10.

FIG. 9 depicts a tubular mounting rivet style fastener 262 according to one non-limited variant of the invention which can be mounted through a pre-drilled hole through the spinous process aligning with a pair of apertures (such as at 264/266 in FIGS. 29-30) formed in either of the upper 228/230 or lower 218/220 gripping pocket defining tabs. The mounting rivet 262 can be solid or, as shown, hollow in a tubular fashion with bone in-growth apertures 268 distribute across the width and circumference of the tubular shaped body. Locating and engaging embossments 270 and 272 are formed at width spaced and circumferentially arrayed locations which, upon width directed installation, align with and simultaneously seat against opposite outward rim surfaces of the mounting tables (again at 228/230) in order to define a correct installation position (again best shown in FIG. 9).

Figure 22:
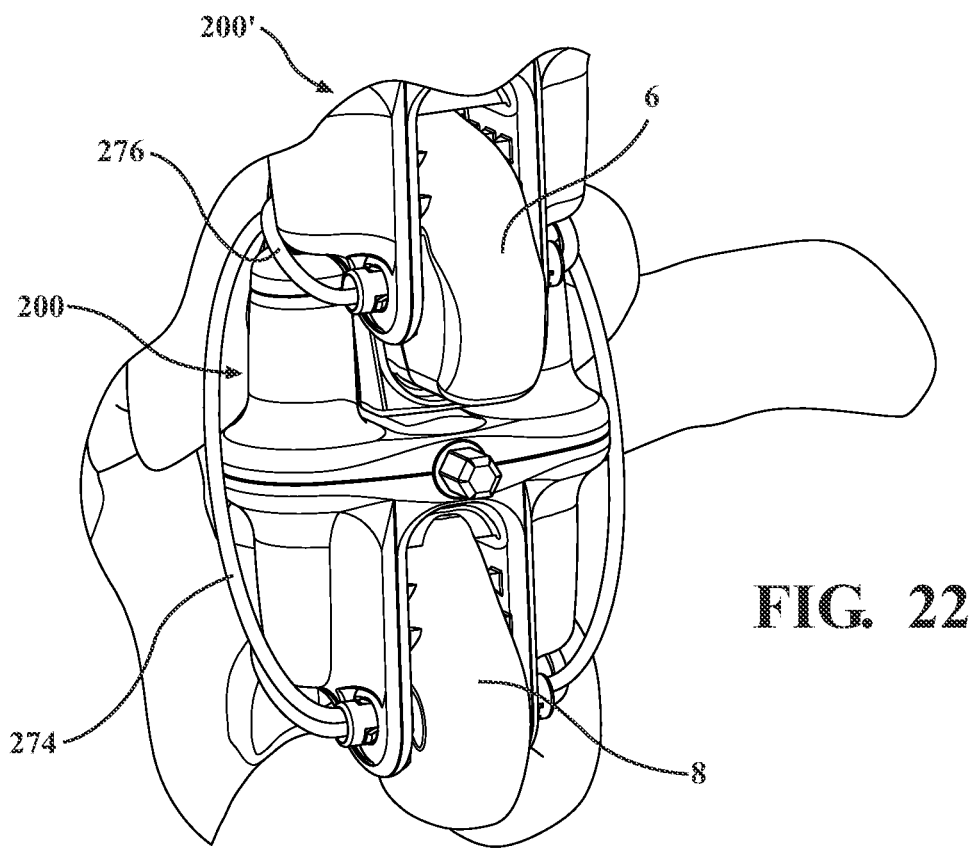
FIG. 22 is depicts a pair of implanted spinal jacks, such as individually shown in FIG. 9, with the further installation of retention cables extending through the hollowed tubular rivets for providing additional retention.

FIG. 22 depicts a pair of implanted spinal jacks 200 and 200', such as individually shown in FIG. 9, with the further installation of retention cables, see at 274 and 276 extending through the hollowed interior of the tubular rivets 262 for providing additional retention properties.

Figure 23:
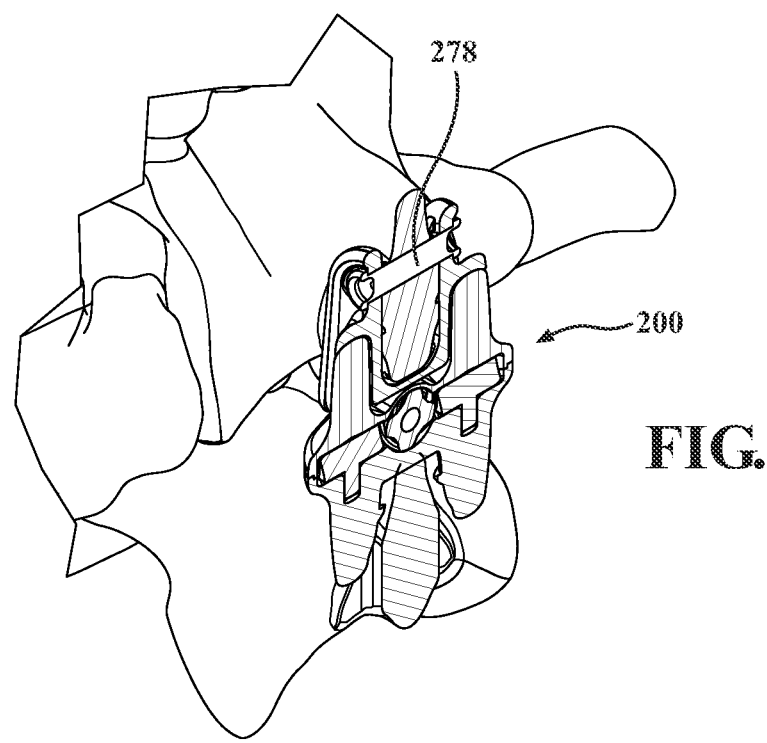
FIG. 23 is a vertical cutaway of a selected implanted spinal implant or jack such as shown in FIG. 22 and exhibiting a solid tubular mounting rivet.
Figure 24:
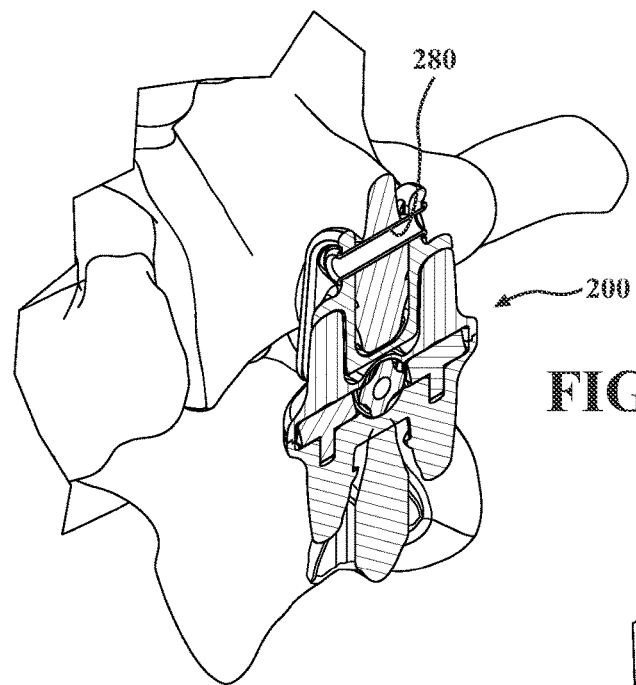
FIG. 24 is a similar view to FIG. 23 and depicting use of a tubular mounting rivet.
Figure 25:
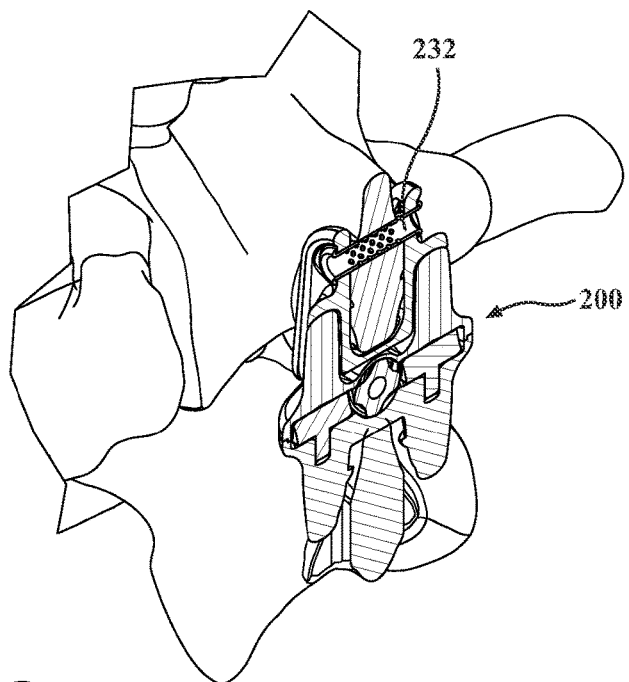
FIG. 25 is a further succeeding view to FIGS. 23-24 and depicting hollowed tubular mounting rivet with bone in-growth apertures such as depicted in FIG. 9 et seq.
Figure 26:
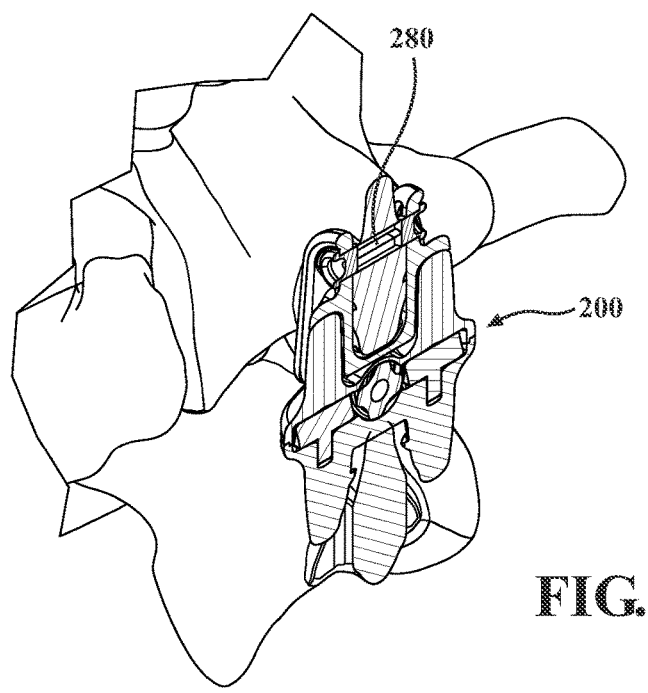
FIG. 26 is a yet further succeeding view depicting a modified tubular rivet with solid end portions and partially open middle.

FIG. 23 presents a vertical cutaway of a selected implanted spinal implant or jack such as shown in FIG. 22 and exhibiting a solid tubular mounting rivet 278. FIG. 24 is a similar view to FIG. 23 and depicting the alternate use of a sold/non-apertured tubular mounting rivet, with FIG. 25 again depicting the hollowed tubular mounting rivet 262 with bone in-growth apertures 268 such as depicted in FIG. 9 et seq. FIG. 26 provides a yet further succeeding view depicting a modified tubular rivet 280, including solid end portions and partially open middle area.

Figure 10:
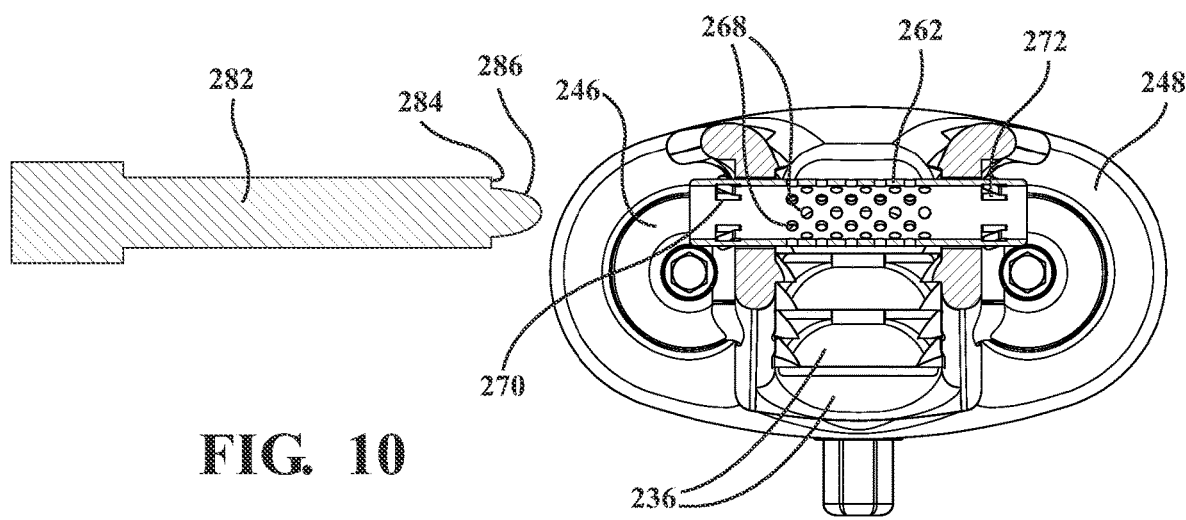
FIG. 10 is an overhead and partially cutaway depiction of the spinal jack of FIG. 9 showing a width directed rivet removal tool bit prior to seating and laterally displacing the rivet from between the tabs and the gripped spinous process.

Referencing now FIG. 10, an overhead and partially cutaway depiction of the spinal jack 200 of FIG. 9 is shown with a width directed rivet removal tool bit 282 prior to seating and laterally displacing the illustrated hollow tubular rivet 262 from between the gripping pocket tabs 228/230 and the selected gripped spinous process. The removal tool bit 282 includes an elongated body of selected diameter with a forward abutment shoulder 284 and terminating conical forward end 286.

Figure 11:
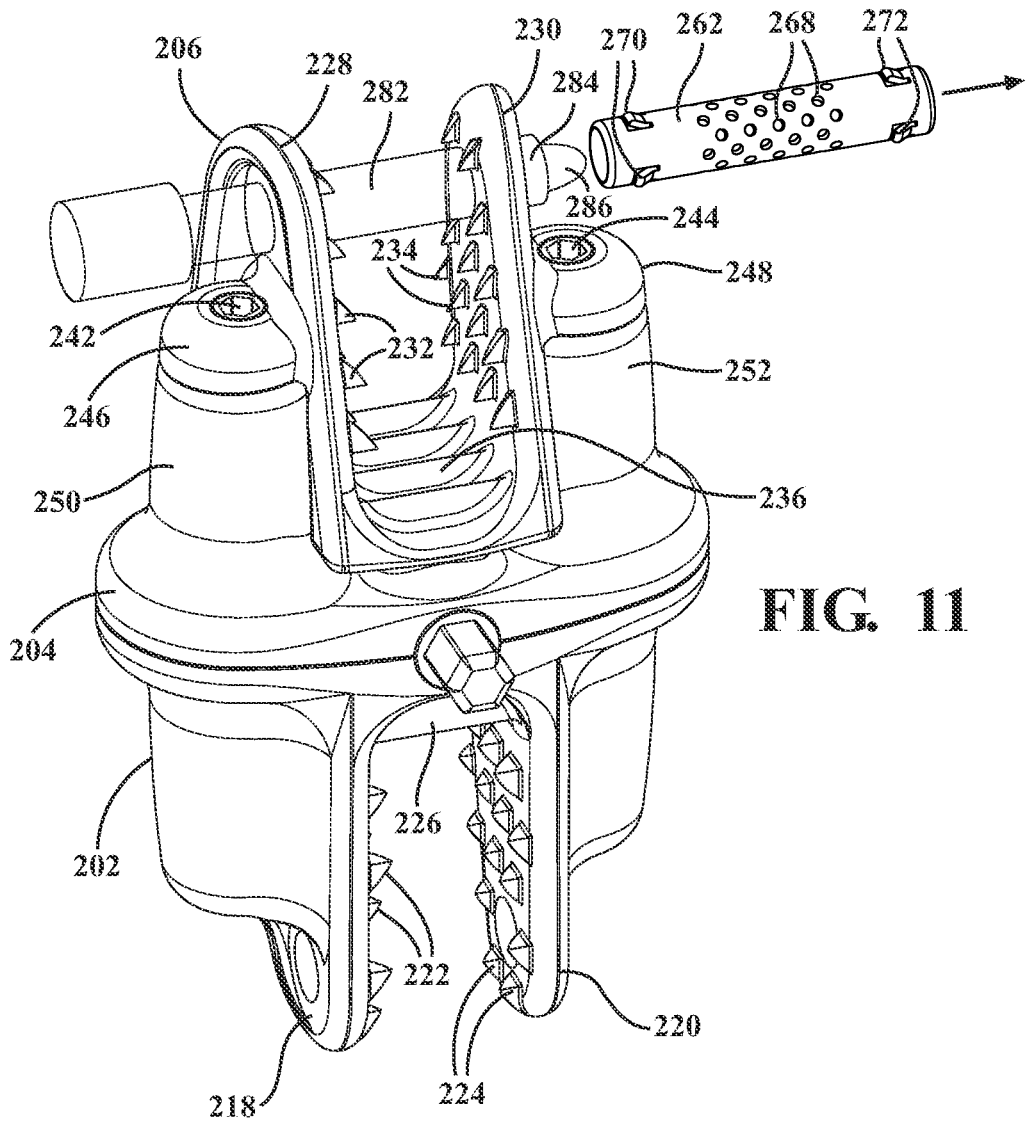
FIG. 11 presents a succeeding view to FIG. 10 and depicting in perspective the removal of the tubular shaped rivet.
Figure 12:
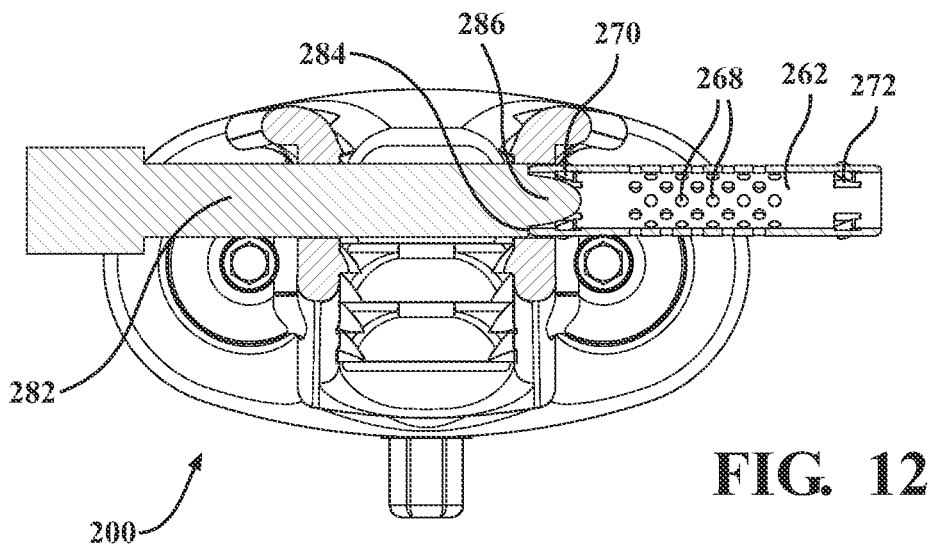
FIG. 12 is a similar view to FIG. 10 and depicting the rivet in a substantially removed position in which the width directed tool bit is substantially translated between the gripping tabs.

FIG. 11 presents a succeeding view to FIG. 10 and depicting in perspective the removal of the tubular shaped rivet 262, with FIG. 12 providing a similar view to FIG. 10 and depicting the rivet 262 in a substantially removed position in which the width directed tool bit 282 is substantially translated between the gripping tabs 228/230 in a fashion which permits the forward abutment shoulder 284 to seat against the opposing tubular end of the rivet 262, with the conical forward end 286 seating within the rivet.

Figure 13:
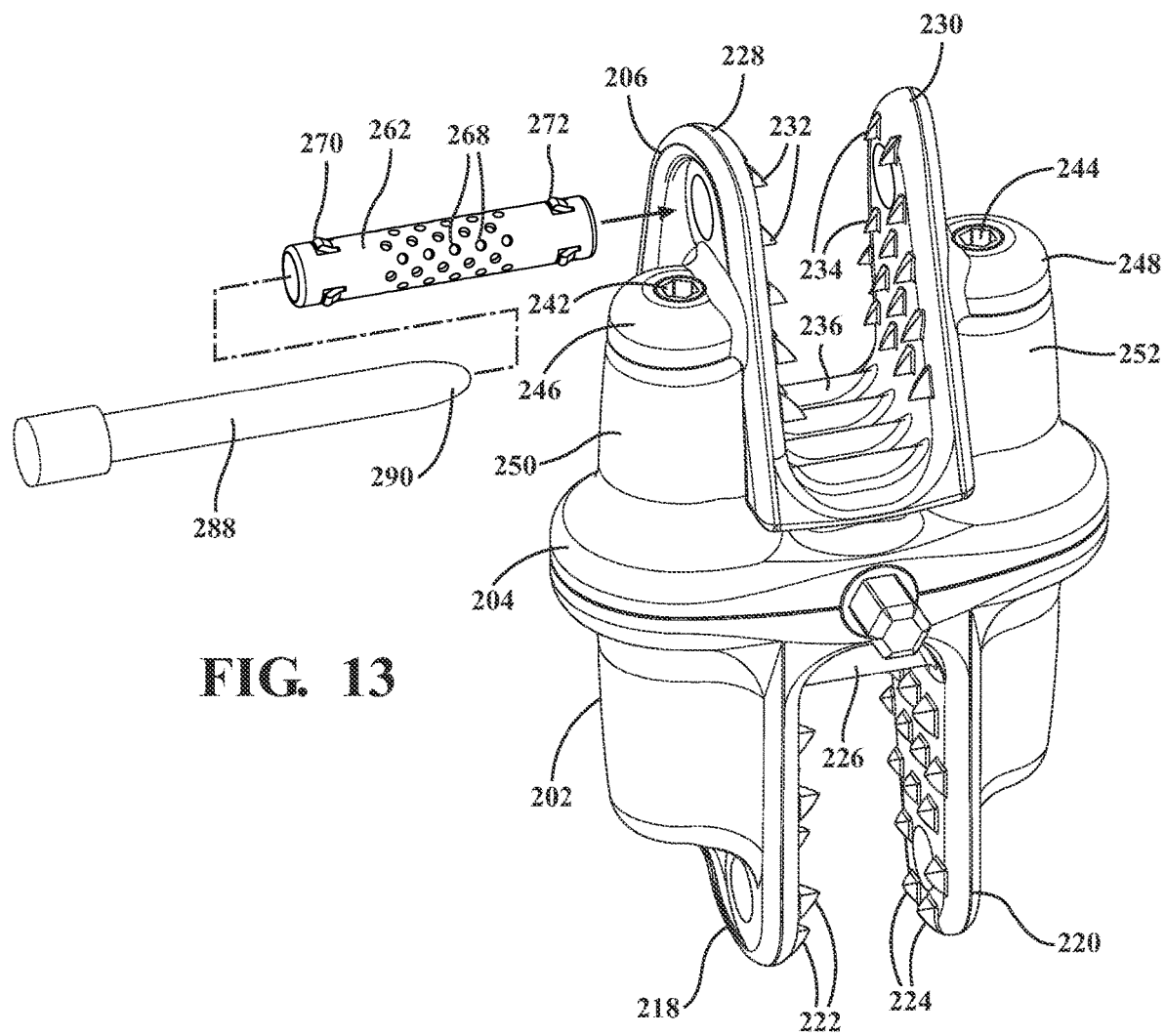
FIG. 13 is an illustration similar to FIG. 9 and depicting the tubular mounting rivet in a pre-installation position, along with an alternately configured width directed rivet installation tool bit, the rivet depicting engagement embossments configured upon the exterior circumference of the tubular rivet in order to define a correct lateral mounting position shown in FIG. 9.
Figure 14:
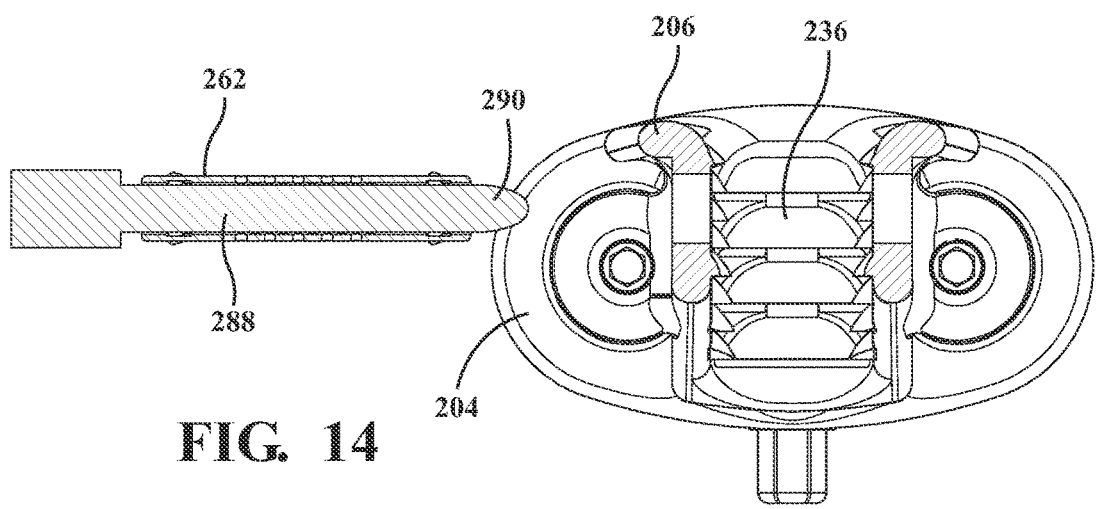
FIG. 14 is an overhead view similar to FIGS. 10 and 12 and, progressing from FIG. 13, depicting the pre-installed tubular rivet seated over the width directed installation tool bit prior to insertion.

FIG. 13 is an illustration similar to FIG. 9 and depicting the tubular mounting rivet 262 in a pre-installation position, along with an alternately configured width directed rivet installation tool bit 288 of a marginally smaller diameter as opposed to the removal bit 282 and which, as shown in FIG. 14, inserting through the hollow interior of the rivet 262 such that a forward end 290 of the tool projects beyond the rivet. As previously described, the rivet 262 depicts engagement embossments 270/272 configured upon the exterior circumference of the tubular rivet in order to define a correct lateral mounting position shown in FIG. 9.

Figure 15:
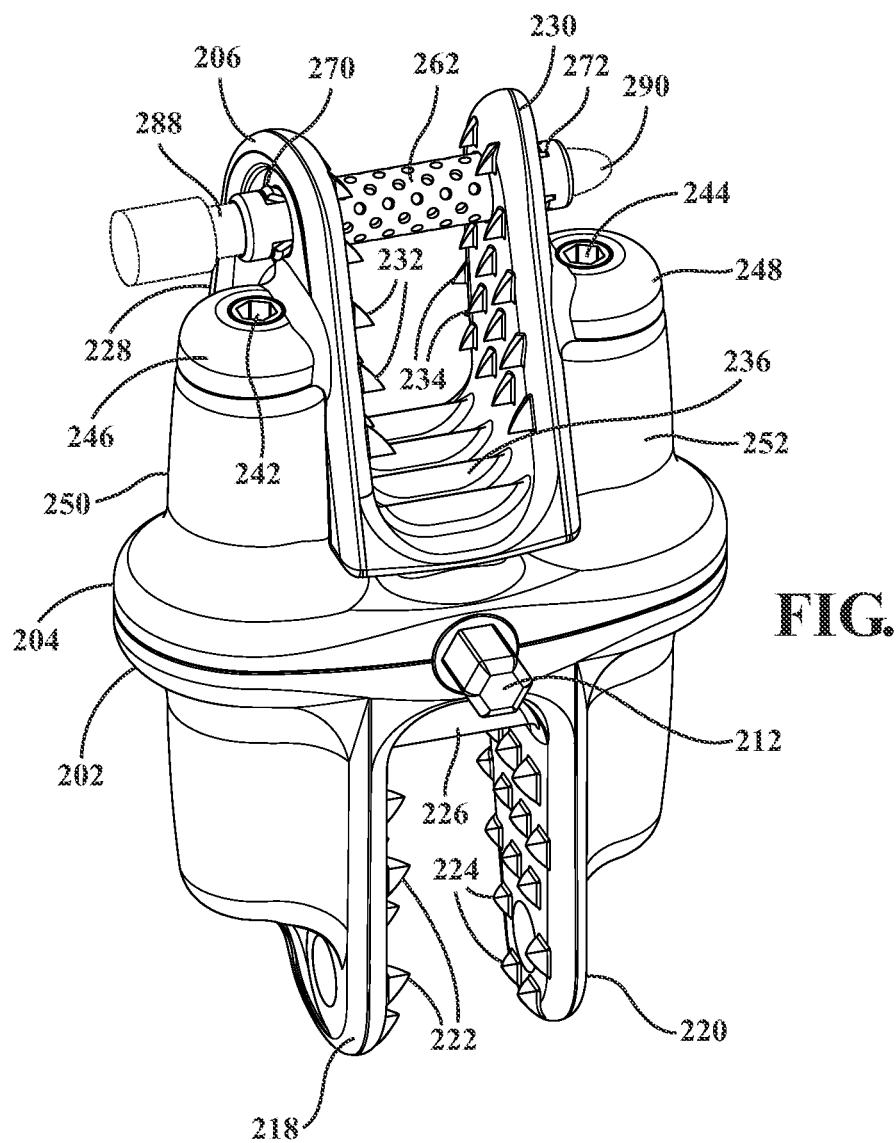
FIG. 15 is a substantial repeat of FIG. 9 showing the tubular shaped mounting rivet engaged and prior to retraction of the width directed installation tool.
Figure 16:
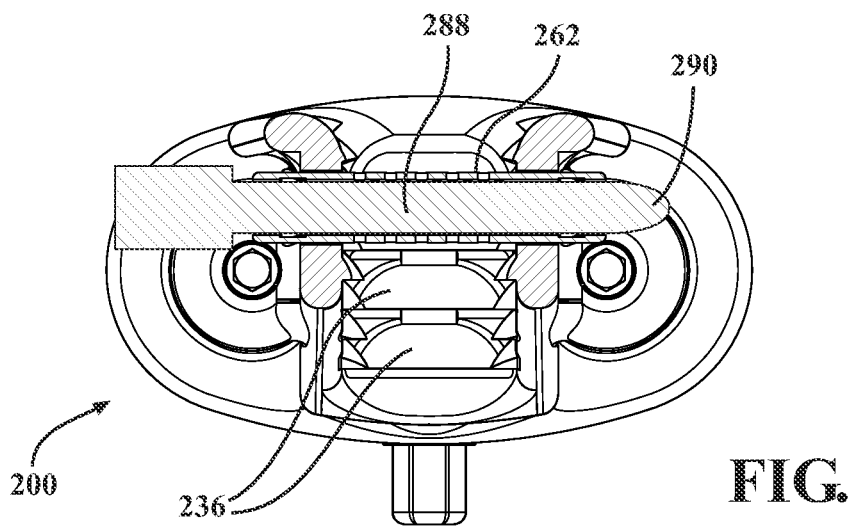
FIG. 16 is an overhead and partially cutaway view of FIG. 15, similar in presentation to each of FIGS. 10, 12, and 14, and again showing the rivet fastener installed through the pre-drilled passageway formed in the vertebral process.

FIG. 14 is an overhead view similar to FIGS. 10 and 12 and, progressing from FIG. 13, depicts the pre-installed tubular rivet seated over the width directed installation tool bit 288 prior to inserting installation. FIG. 15 is a substantial repeat of FIG. 9, showing the tubular shaped mounting rivet engaged and prior to retraction of the width directed installation tool. FIG. 16 provides an overhead and partially cutaway view of FIG. 15, similar in presentation to each of FIGS. 10, 12, and 14, and again showing the selected rivet fastener 262 installed through the pre-drilled passageway formed in the vertebral process.

Proceeding to FIG. 17, an environmental illustration similar to that shown in FIG. 8 depicts a crimping option including a plier's like tool pivotally associated and opposing jaws 292/294 of the crimping tool 77 for deforming and affixing the extending tabs (see again at 228/230) defining each of the upper and lower gripping pockets against the spinous processes, such as additionally or alternative to the use of mounting fasteners of FIG. 9.

FIG. 18 provides a perspective of an installation tool 296 which provides for locating and resistive seating of the spinal implant 200 against the spinous processes of the successive vertebrae (see again FIG. 8) such that, and upon initial linear seating of the implant pockets to the spinal or spinous processes, exerted impact forces upon the tool resistively seat the gripping pockets against the spinal processes. In the initial installation configuration, a rectangular forward end location 298 of the tool 296 is biasingly compressed between the opposing undersides of the process gripping pockets in a partially separated configuration in order to permit extension and initial affixation to the spinous processes within the body cavity.

The implant tool 296 includes an elongated neck 300 which extends from the forward rectangular end location 298 to a rear annularly expanded support collar 301 which in turn support a removable handle 302. Upon removal of the handle 302, it reveals a rear projecting end 304 of a tool bit driver extending within the tool interior of the neck 300 to a forward located bit engaging socket (not shown) which is located within the forward interior of the rectangular end 298 and which, as arrayed in FIG. 18, is in turn engaged to the receiving bit (30 or 212) of the implant jack. Successive rotation of the rear driver 304 rotates the hex bit to initiate separation of the upper and lower implant bodies.

Figure 19:
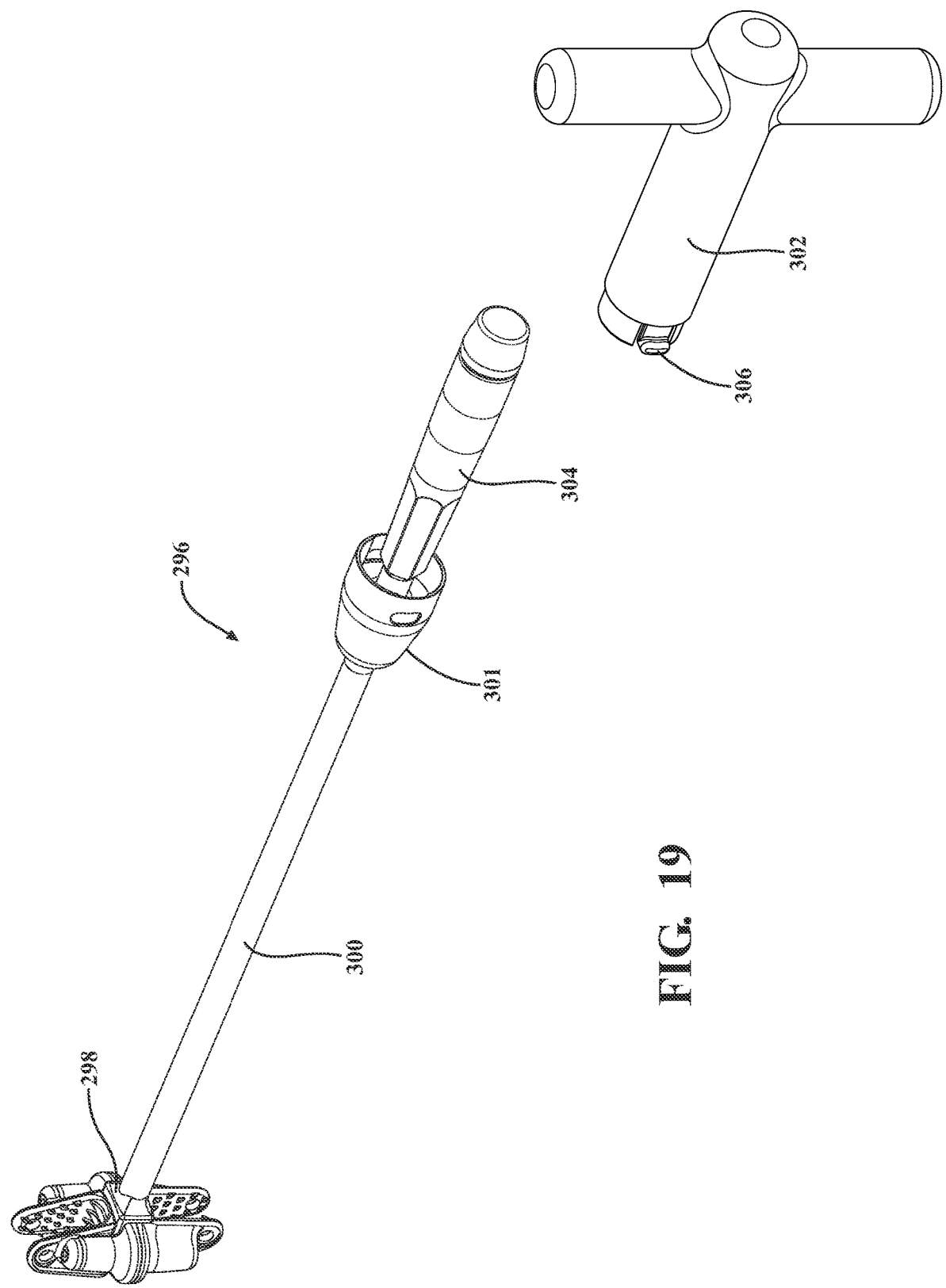
FIG. 19 is a succeeding view to FIG. 18 and depicting a removable rear handle end of the tool revealing a rear projecting end of a tool bit driver extending within the tool interior to a forward located bit engaging socket.

FIG. 19 is a succeeding view to FIG. 18 and depicting the removal of the rear handle end 302 of the tool, again revealing the rear projecting end of the tool bit driver 304 extending within the tool interior to the forward located bit engaging socket. Removal of the handle 302 can be facilitated by press tabs 306 which seats through a matching recess 308 in the support collar 301 and which, upon being inwardly depressed, allows the handle to removed, such as following an initial forward impact assisted installation of the implant 200, such as with the assistance of a mallet, hammer or the like.

FIG. 20 is a further succeeding view to FIG. 19 and depicts a rotation (see arrow 310) of the rear driver 304 in order to rotate the hex bit to initiate separation of the upper and lower implant bodies (see as further referenced by upward directional arrow 312). FIG. 21 is an enlarged view of forward area 21 of the implant tool depicted in FIG. 20 and depicting the rotating expansion of the upper and lower spinal body portions (at this point the initial lodging of the implant gripping pockets to the spinous processes as shown in FIG. 8 allowing for continued connection between the hex bit driver of the tool with the implant hex bit 212) following upward displacement of the upper body portion 206 away from compressing abutment with the rectangular forward location 298.

Figure 27:
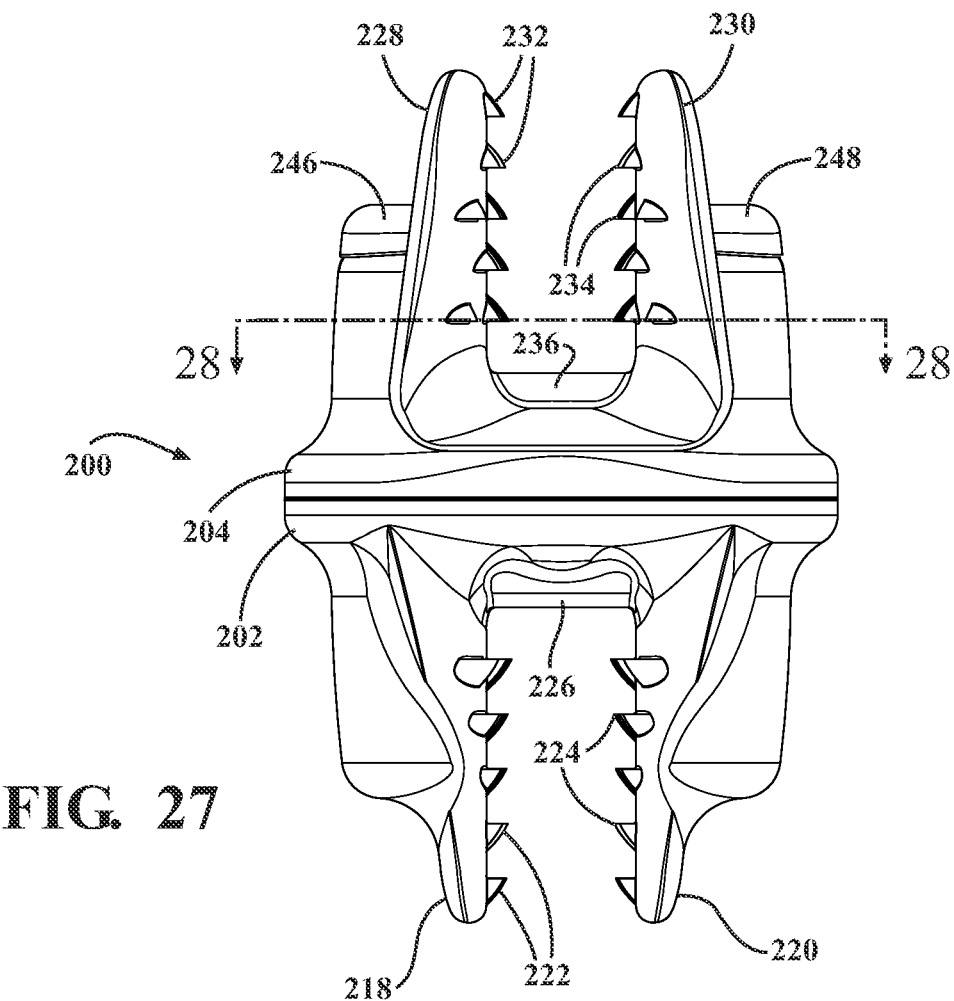
FIG. 27 is a rear plan view of a selected spinal implant jack and depicting an arrangement of gripping teeth associated with the process engaging pockets configured in each of the upper and lower body portions.
Figure 28:
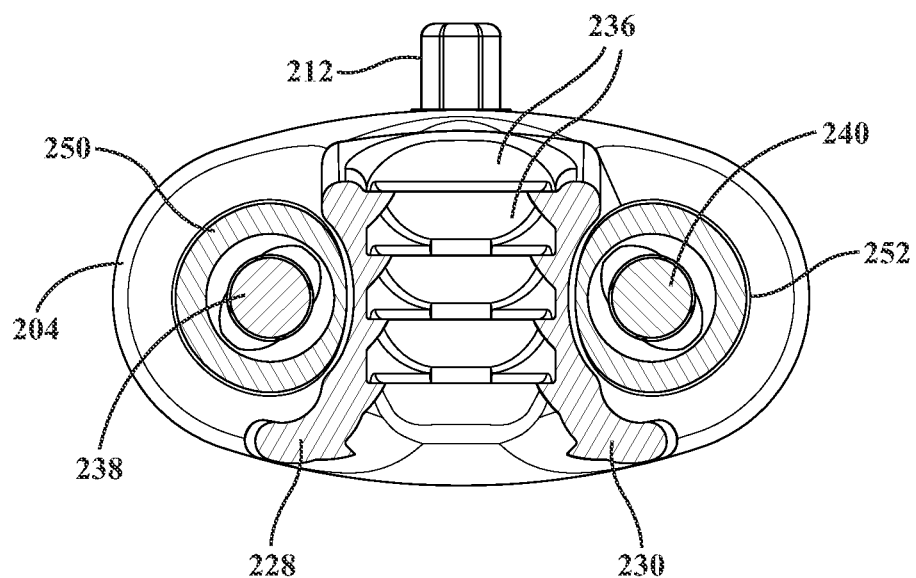
FIG. 28 is a horizontal cutaway view taken along line 28-28 of FIG. 27 and better illustrating the configuration of the base surface gripping teeth associated with the upper process engaging pocket.

Referring to FIG. 27, a rear plan view is shown of selected spinal implant jack 200 and depicting an arrangement of the gripping teeth associated with each of the process engaging pockets configured in each of the upper and lower body portions. As generally illustrated, the gripping teeth patterns are sized smaller to larger in each of inward and rearward engaging directions against and around the spinous processes. FIG. 28 provides a horizontal cutaway view taken along line 28-28 of FIG. 27 and better illustrating the configuration of the base surface gripping teeth associated with the upper process engaging pocket.

Figure 31:
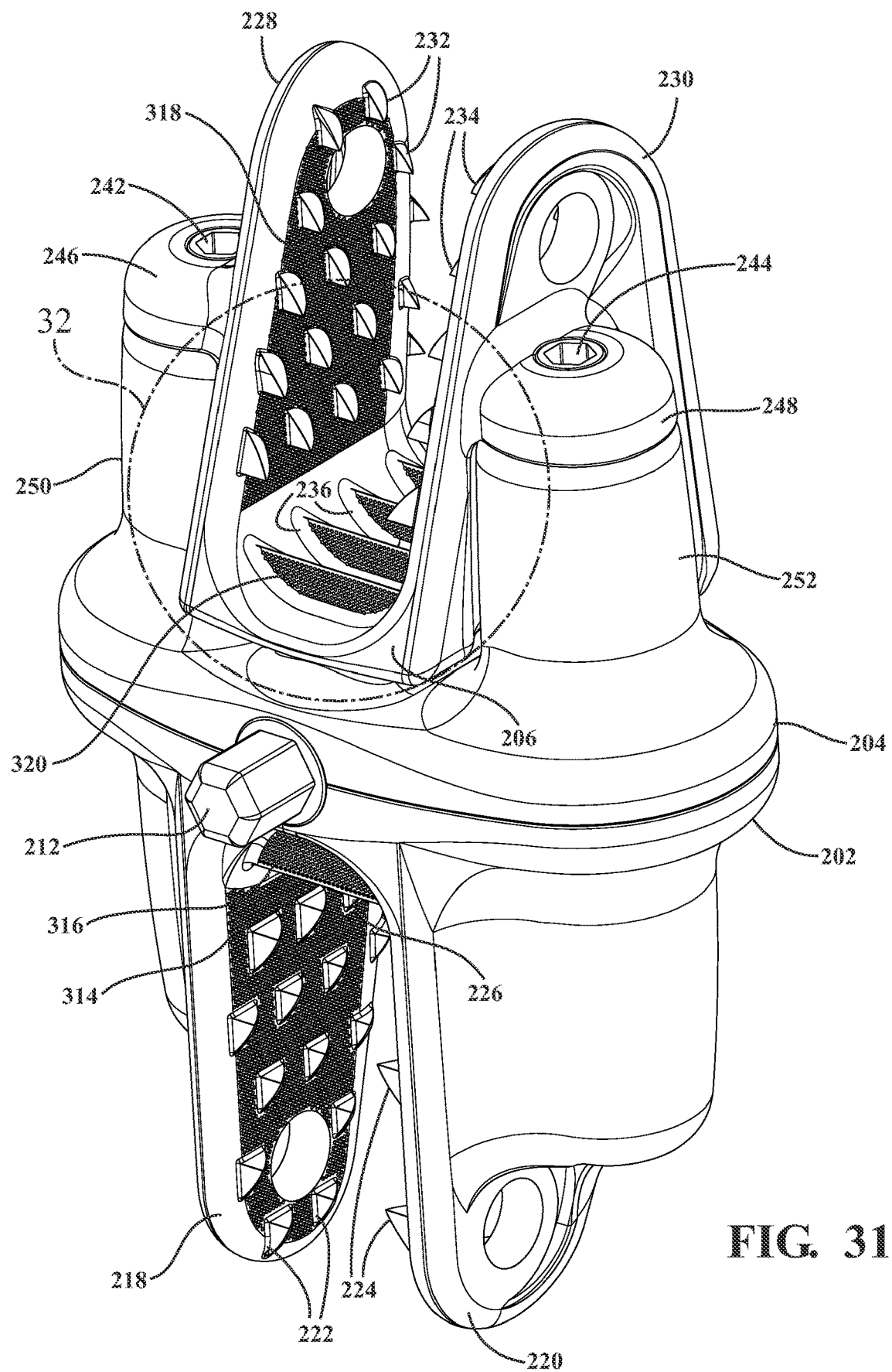
FIG. 31 presents a depiction of a spinal implant jack exhibiting aperture patterns distributed across the gripping pockets, such as which can be accomplished as part of a three dimensional or additive printing process for forming each of the individual outer body components, including each of the first and second outer subset lower body portions and displaceable upper body, without limitation the additive printed material including a titanium or other suitable medical grade material including other metals or polymeric composites.

Proceeding to FIG. 31, presented is a depiction of a spinal implant jack exhibiting surface aperture (also termed "latticed") patterns distributed across the gripping pockets. These are generally shown by latticing patterns 314 and 316 visible in lower pocket along gripping locations 232 and 236, with like upper pocket latticing patterns at 318 and 320 corresponding with the arrangement of gripping locations 232 and 236.

Surface latticing can be accomplished as part of a three dimensional or additive printing process for forming each of the individual outer body components, including each of the first 202 and second 204 subset lower body portions and displaceable upper body 206, without limitation the additive printed material including a titanium or other suitable medical grade material including other metals or polymeric composites.

Figure 32:
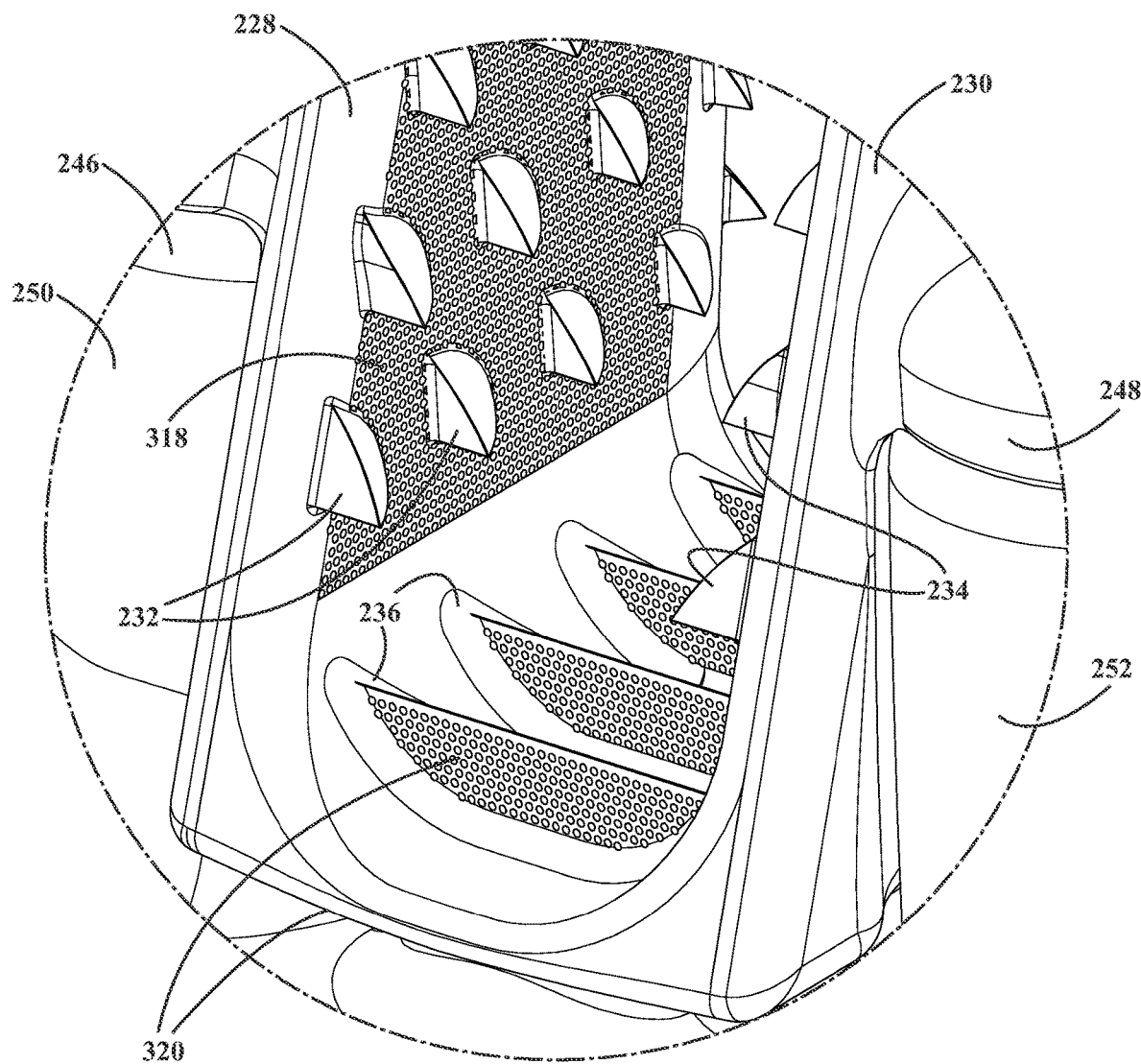
FIG. 32 illustrates an expanded area referenced in FIG. 31 of the spinal process gripping pocket associated with the upper body portion and better depicting the latticing of the surface layers in order to promote bone in-growth following implantation, the additive printing techniques employed for producing the implant body components permit the configuration of the teethed gripping portions according to varying sizes and directions, such as increasing in size in both inward and/or downward seating directions in order to enhance the initial seating engagement of the spinal processes into the implant gripping pockets.
Figure 33:
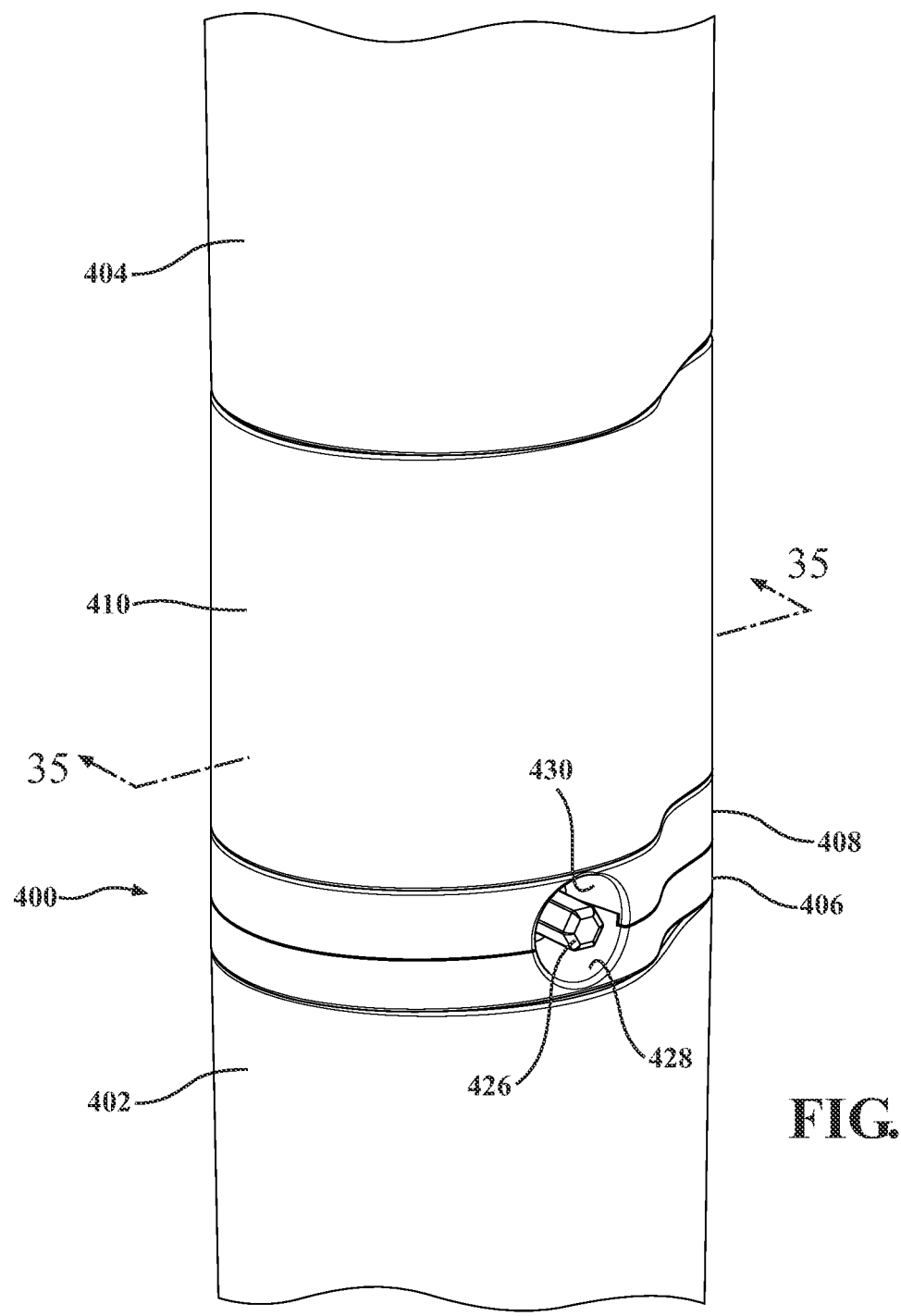
Figure 34:
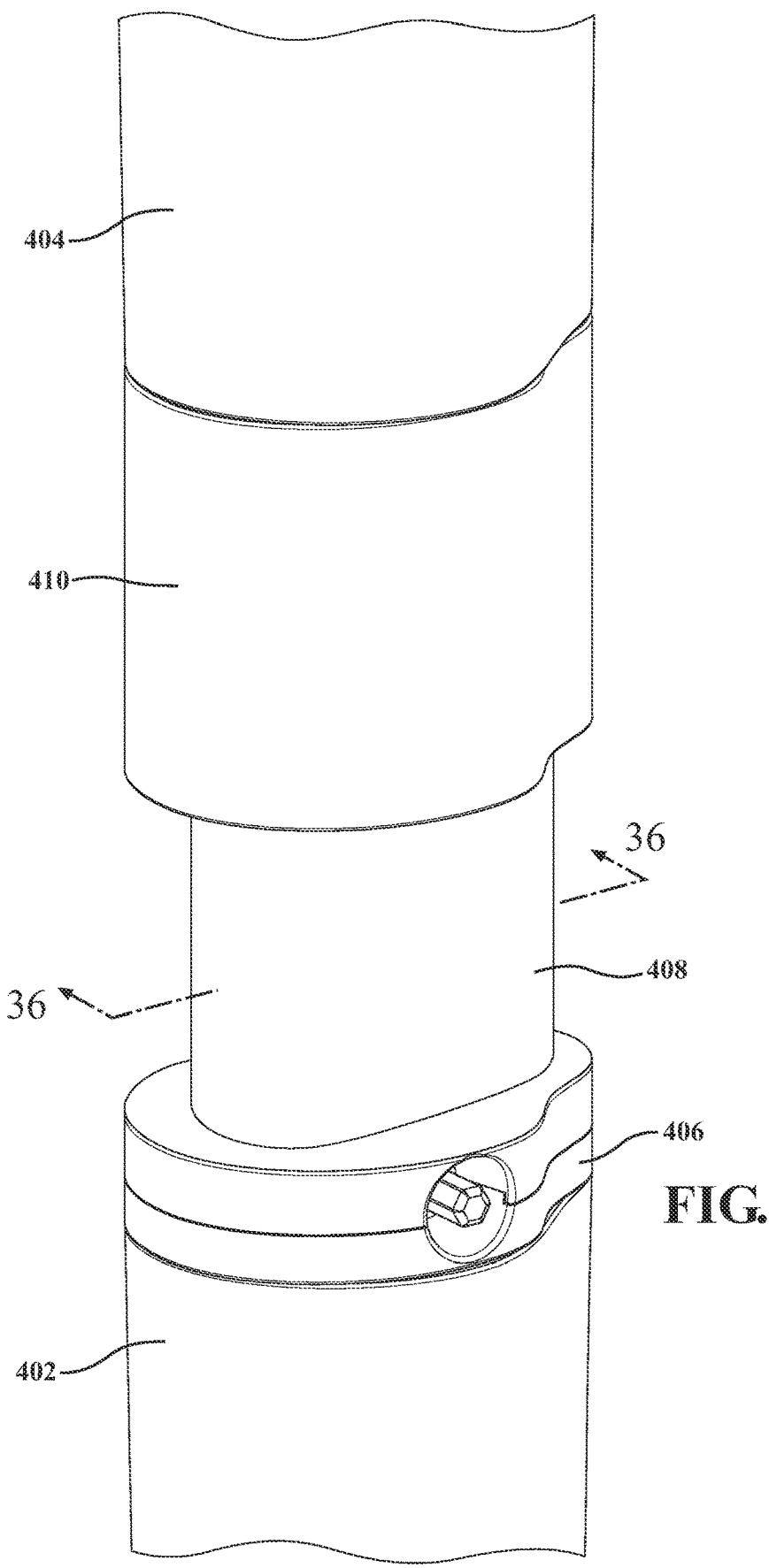
FIG. 34 presents a succeeding illustration to FIG. 33 in which the upper and lower implant bodies are shown in an expanded configuration.

FIG. 32 illustrates an expanded area referenced in FIG. 31 of the spinal process gripping pocket associated with the upper body portion and better depicting the latticing of the surface layers in order to promote bone in-growth following implantation. The additive printing techniques employed for producing the implant body components permit the configuration of the teethed gripping portions according to any desired varying sizes and directions, such as again increasing in size in both inward and/or downward seating directions in order to enhance the initial seating engagement of the spinal processes into the implant gripping pockets;

Proceeding to FIG. 33, presented is a perspective environmental 400 of a further version of an implant for non-vertebral applications, such as in use with first 402 and second 404 segmented bones associated with any of a humerus, femur or the like. FIG. 34 presents a succeeding illustration to FIG. 33 in which lower body implant portions 406 and 408 and upper body implant portions 410 are shown in an expanded configuration.

Figure 35:
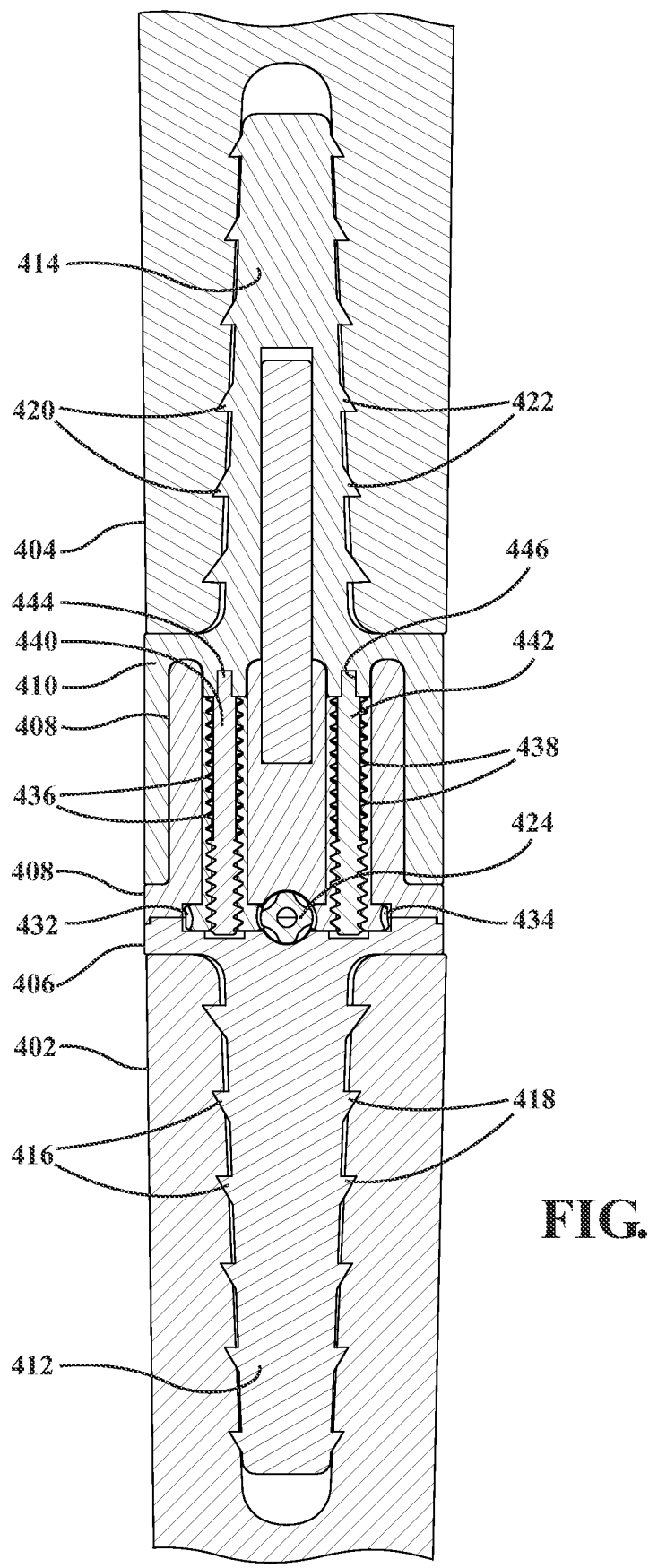
FIG. 35 is a vertical cutaway taken along line 35-35 of FIG. 33 and depicting the configuration of the implant in which the U shaped vertebral process seating pockets of the earlier embodiments are reconfigured as inner elongated bodies which seat within the marrow interiors of the elongated bone segments, for bonding the upper and lower body portions to the opposing end faces of the bone segments.

FIG. 35 is a vertical cutaway taken along line 35-35 of FIG. 33 and depicting the configuration of the implant in which the U shaped vertebral process seating pockets of the earlier embodiments are reconfigured as inner elongated body portions, including lower elongated body portion 412 integrated into lower implant 406 and upper elongated body portion 414 integrated into upper body 410.

The body portions 412 and 414 each further exhibit integrated gripping portions (see at 416/418 for lower elongated portion 412 and at 420/422 for upper elongated portion 414) which seat within the marrow interiors of the elongated bone segments 402/404, for bonding the upper 410 and lower 406/408 body portions to the opposing end faces of the bone segments. As further shown, the upper 408 of the lower body portions and the nesting upper body portion 410 each exhibit a multi-walled and nesting arrangement for providing effective multi-directional support in any loading direction.

Figure 36:
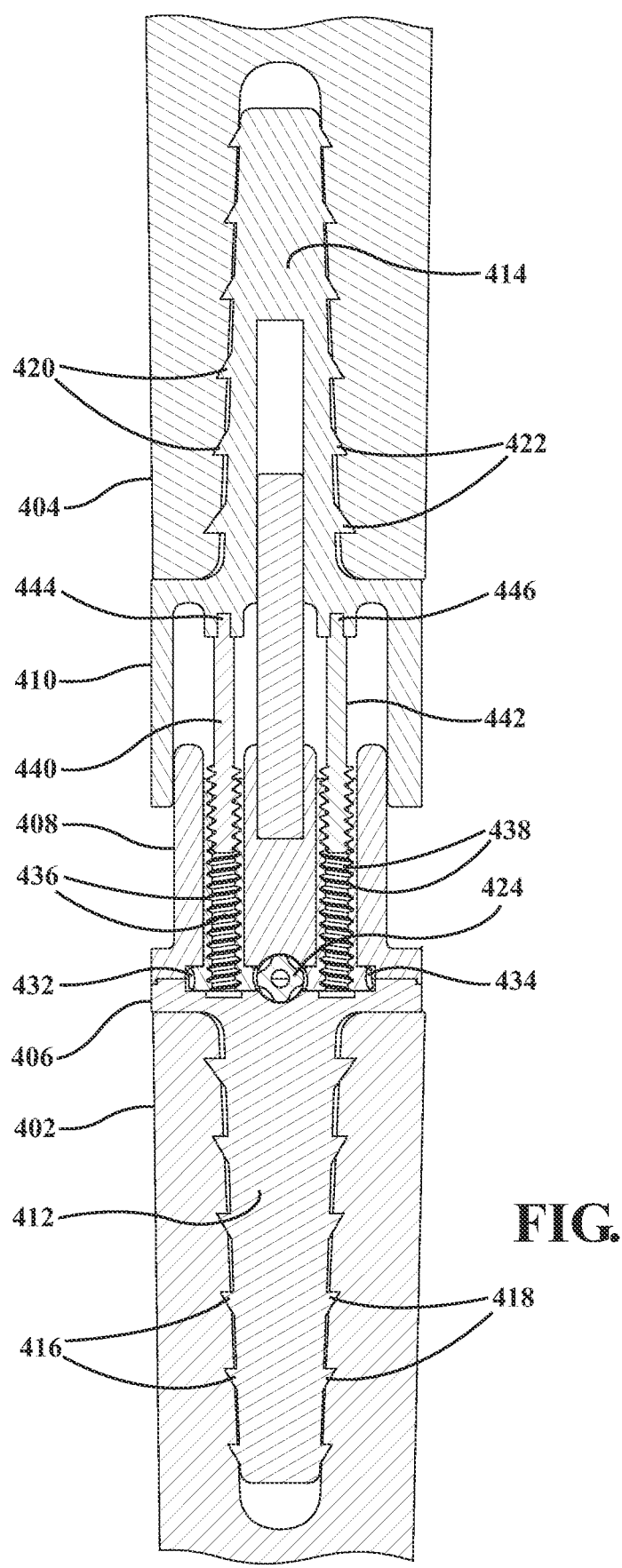
FIG. 36 is a vertical cutaway taken along line 36-36 of FIG. 34 and depicting the expanded configuration established between the implant upper and lower body portions for establishing a desired and adjustable separation distance between the bone segments.

FIG. 36 is a vertical cutaway taken along line 36-36 of FIG. 34 and depicts the expanded configuration established between the implant upper 410 and lower 406/408 body portions for establishing a desired and adjustable separation distance between the bone segments 402/404. The body portions 406/408/410 can again each be constructed by any forming process including molding, additive manufacturing or the like.

As with the spinal implant bodies 10 and 200, the lower body portions 406/408 contain a worm gear mechanism including a central worm gear 424 with surface accessible integrated hex bit 426 recessed into a surrounding pocket defined by mating rim surfaces 428 and 430 defined in body portions 406/408. FIGS. 35 and 36 depict outer gears 432/434 which seat lower threaded ends 436/438 of a pair of displacement stems 440/442. The stems are further connected at upper ends 444/446 to inside locations of the upper body portion 410.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments.

Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A spinal jack adapted for installation between first and second vertebral processes, comprising:
   a three dimensional body constructed from each of an upper body portion and a lower body portion;
   each of said upper and lower body portions further including bone gripping surfaces adapted for engaging the vertebral processes, said bone gripping surfaces each further including a "U" shaped pocket;
   pairs of aligning apertures formed through spaced extending tabs of said "U" shaped pockets configured to be aligned with recesses drilled through the vertebral processes;
   rivets received in the aligning apertures for securing said upper and lower body portions to the vertebral processes, said rivets further having a tubular shape with apertures distributed across a width and circumference thereof for facilitating bone in-growth, locating and engaging embossments formed at width spaced and circumferentially arrayed locations of said rivets;
   a worm gear mechanism for adjusting a separation distance between said upper and lower body portions and including a rotatable worm gear engaging a pair of outer gears arranged on opposite side of said worm gear; and
   a pair of stems anchored to said upper body portion, said stems including additional worm threads inter-engaging with mating interior threads defined in said outer gears such that rotation of said worm gear linearly displaces said stems and said upper body portion relative to said lower body portion.

2. The spinal jack of claim 1, further comprising a bit engaging portion integrally formed with said worm gear and projecting from a surface of said lower body portion.

3. The spinal jack of claim 1, further comprising said "U" shaped pocket exhibiting gripping teeth and facilitating unidirectional installation against the processes along with preventing detachment from uneven surfaces of the processes once installed.

4. The spinal jack of claim 1, said upper and lower body portions further comprising a medical grade metal or plastic.

5. The spinal jack of claim 1, said lower body portion incorporating a recessed cavity for receiving said rotatable worm gear and said outer gears.

6. The spinal jack of claim 5, further comprising additional cavities configured into said body portions for seating said displaceable stems.

7. The spinal jack of claim 1, said lower body portion further comprising first and second subset portions incorporating said worm gear mechanism.

8. The spinal jack of claim 7, further comprising each of said upper body portion and first and second subset portions being constructed from an additive printed material.

9. The spinal jack of claim 8, further comprising latticing patterns formed in the bone gripping surfaces.

10. The spinal jack of claim 1, further comprising said rivets being hollowed to receive retention cables.

11. A system including the spinal jack of claim 2, further comprising an installation tool for locating and seating said upper and lower body portions against the vertebral processes.

12. A system including the spinal jack of claim 1, further comprising a rivet installation tool configured to be inserted through a hollow interior of said rivet which, upon width directed installation, aligns and seats said locating and engaging embossments against opposite outward rim surfaces of said tabs.

13. A system including the spinal jack of claim 1, further comprising a rivet removal tool bit having an elongated body with a forward abutment shoulder and terminating in a conical forward end.

* * * * *